(12) United States Patent
Dykes et al.

(10) Patent No.: US 8,576,229 B2
(45) Date of Patent: Nov. 5, 2013

(54) METEOROLOGY AND OCEANOGRAPHY GEOSPATIAL ANALYSIS TOOLSET

(75) Inventors: James D Dykes, Slidell, LA (US); Philip J Fanguy, Picayune, MS (US); Thomas Gray, Gulfport, MS (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 173 days.

(21) Appl. No.: 13/017,537

(22) Filed: Jan. 31, 2011

(65) Prior Publication Data

US 2012/0194558 A1   Aug. 2, 2012

(51) Int. Cl.
*G06T 11/20* (2006.01)

(52) U.S. Cl.
USPC ............... 345/440; 345/440.1; 345/440.2

(58) Field of Classification Search
USPC ................................................... 345/440
See application file for complete search history.

(56) References Cited

PUBLICATIONS

Essa Technologies, "River Bathymetry Toolkit", 2010, http://www.fs.fed.us/rm/boise/AWAE/projects/RBT/downloads/RBT_Workbook_Final.pdf.*
Esri, "ArcGIS Desktop Help 9.3: Creating countours". http://webhelp.esri.com/arcgisdesktop/9.3/index.cfm?TopicName=welcome.*
Esri, "ArcGIS Desktop Help 9.3: Displaying rasters". http://webhelp.esri.com/arcgisdesktop/9.3/index.cfm?TopicName=welcome.*
Esri, "ArcGIS Desktop Help 9.3: Specifying a coordinate system". http://webhelp.esri.com/arcgisdesktop/9.3/index.cfm?TopicName=welcome.*
Esri, "ArcGIS Desktop Help 9.3: An overview of ArcMap".http://webhelp.esri.com/arcgisdesktop/9.3/index.cfm?TopicName=welcome.*
Esri, "ArcGIS Desktop Help 9.3: Representing netCDF data as a roster layer".http://webhelp.esri.com/arcgisdesktop/9.3/index.cfm?TopicName=welcome.*
Esri, "ArcGIS Desktop Help 9.3: Displaying netCDF data". http://webhelp.esri.com/arcgisdesktop/9.3/index.cfm?TopicName=welcome.*
Jim McKean, "High Resolution Bathymetry of Rivers".*
Venkatesh Merwade, Aaron Cook, Julie Coonrod, "GIS techniques for creating river terrain models for hydrodynamic modeling and flood inundation mapping", Environmental Modelling & Software 23 (2008) 1300-1311.*
Venkatesh Merwade, "Creating river bathymetry mesh from cross-sections", Jun. 2008.*
"River Channels—Center for Research in Water Resources" www.crwr.utexas.edu/gis/gishydro00/ArcGIS/chapter5.pdf.*
Howe, B., Lawson, P., Bellinger, R., Anderson, E., Santos, E., Freire, J., Scheidegger, C., Baptista, A., Silva, C.: End-to-end escience: Integrating workflow, query, visualization, and provenance at an ocean observatory. In: Procs Fourth IEEE International Conference on eScience, pp. 127-134 (2008).*
Q. Ho, and M. Jern, "Exploratory 3D Geovisual Analytics," in Research, Innovation and Vision for the Future, 2008. RIVF 2008. IEEE International Conference on, 2008.*

(Continued)

*Primary Examiner* — Ryan R Yang
*Assistant Examiner* — Jin Ge
(74) *Attorney, Agent, or Firm* — US Naval Research Laboratory; Amy L. Ressing; Kathleen Chapman

(57) ABSTRACT

System and method for providing access to ArcMap netCDF utilities and adding support for observational data to ArcMap including, but not limited to, comparing observational data to model data in a graphical manner, and maintaining the security classifications for each layer in ArcMap so that the highest security classification of the data being viewed is known at all times.

19 Claims, 26 Drawing Sheets

(56) References Cited

PUBLICATIONS

James D. Dykes, Jay F. Shriver and Sean Ziegeler, "Automation of Ocean Model Performance Metrics", OCEANS 2009, MTS/IEEE Biloxi—Marine Technology for Our Future: Global and Local Challenges Oct. 26-29, 2009, p. 1-7.*

Shen, Y.Z., Austin, J. A., Crouch, J. R., and Dinniman M. S., 2007, "Interactive visualization of Regional Ocean Modeling System", Proceedings of the IASTED International Conference on Graphics and Visualization in Engineering, 74-82.*

Van Ho Q., Lundblad P., Åström T., Jern M. "A Web-Enabled Visualization Toolkit for Geovisual Analytics", Information Visualization 11, 1 (2012), 22-42. 2.*

Q. Ho and M. Jern, "Interacting with 4D oceanographic volume data using GeoAnalytics tools," National Center for Visual Analytics NCVA, Linköping University, Sweden, 2008.*

Dykes, James; Shriver, Jay; Fabre, Josette; Wang, David; Murhpree, Tom; Chassignet, Eric, "Automation of Ocean Product Metrics", Naval Research Lab Stennis Space Center MS, Sep. 30, 2008.*

Allen, G., and Coauthors, 2008: Towards an integrated GIS—based coastal forecast workflow. Concurrency and Computation—Practice & Experience, 20, 1637-1651. http://onlinelibrary.wiley.com/doi/10.1002/cpe.1293/pdf.

Dykes, J. D., T. E. Hancock, 2002: Brokering meteorological and oceanographic information in support of military operations using GIS technology. Oceans 2002 MTS/IEEE Conf. & Exhibition, vols. 1-4, Conf. Proc., 1114-1120. http://ieeexplore.ieee.org/stamp/stamp.jsp?arnumber=01192122.

Edson, D., J. A. Lever, C. Kelly, and J. Goudeau, 2001: Implementation of the Meteorology and Oceanography Geospatial Initiative at the Naval Oceanographic Office. MTS/IEEE Oceans 2001. An Ocean Odyssey. Conf. Proc. (IEEE Cat. No. 01CH37295). http://ieeexplore.ieee.org/stamp/stamp.jsp?tp=&arnumber=968293.

ESRI (Environmental Systems Research Institute, Inc.), 2004a. Introduction to COM: The Microsoft Component Object Model. ESRI. Homepage http://arcobjectsonline.esri.com.

Rouse, Zachary T., 2009: Anti-submarine Warfare Visual Analysis Tool Geospatially Enabling Four Dimensional METOC Data.

Gough, E. C., 2004: Technical advances in the naval meteorology and oceanography program. Proc. 2004 Int'l Symp. on Underwater Technol., 433-438. http://ieeexplore.ieee.org/stamp/stamp.jsp?tp=&arnumber=1405642.

Meyer, J. F., 2007: Service oriented architecture (SOA) migration strategy for U.S. operational naval meteorology and oceanography (METOC). Oceans 2007—Europe. http://ieeexplore.ieee.org/stamp.jsp?tp=&arnumber=4302484.

Petry, F. E. 2009: Issues for meteorological and oceanographic data web services. Oceans 2009. http://ieeexplore.ieee.org/stamp/stamp.jsp?arnumber=05422439.

Williams, P., 2010: Navy Web Portal Improves Access for Meteorology, Oceanography Professionals. Sea Technology, 51, 15-17. http://www.sea-technology.com/features/2010/0510/navy_web_portal.html.

Williams, P. V., 2009: Role of Web 2.0 in Navy Meteorology and Oceanography (METOC). Oceans 2009. http://ieeexplore.ieee.org/stamp/stamp.jsp?tp=&arnumber=5422383.

ESRI (Environmental Systems Research Institute, Inc.), 2004b. Geodatabase Object Model. ESRI. Homepage http://arcobjectsonline.esri.com.

* cited by examiner

METEOROLOGY AND OCEANOGRAPHY GEOSPATIAL ANALYSIS TOOLSET

CROSS-REFERENCE TO RELATED APPLICATIONS

Not applicable.

REFERENCE TO A COMPACT DISK APPENDIX

Not applicable.

BACKGROUND

Methods and systems disclosed herein relate generally to adding further capabilities for accessing netCDF data using ArcMap. For a description of the current netCDF/ArcMap interface and capabilities, see http://webhelp.esri.com/arcgisdesktop/9.3/, from which the following information has been, in part, derived. NetCDF (Network Common Data Form) is a set of software libraries and self-describing, machine-independent data formats that support the creation, access, and sharing of array-oriented scientific data. A netCDF file contains dimensions, variables, and attributes. A netCDF dimension has both a name and a size and can be used to represent a real physical dimension, for example, time, latitude, longitude, or height. A variable represents an array of values of the same type, and has a name, a data type, and a shape described by its list of dimensions specified when the variable is created. NetCDF attributes are used to store ancillary data or metadata.

ArcMap is the main component of the ARCGIS® suite of geospatial processing programs, and is used for all map-based tasks including cartography, map analysis, and editing of geospatial data. Through ArcMap, it is possible to explore data within a data set, symbolize features accordingly, and create maps. In the ArcMap geographic data view, geographic layers are symbolized, analyzed, and compiled into GIS data set. Drawing properties of the GIS data layers in the data frame can be organized and controlled by ArcMap geographic data view, making the geographic data view a window into a GIS data set for a given area. In the ArcMap layout view, map pages contain geographic data views as well as other map elements such as scale bars, legends, north arrows, and reference maps. ArcMap is used to compose maps on pages for printing and publishing. A shapefile is a digital vector storage format for storing geometric location and associated attribute information. The shapefile format can store primitive geometrical data types of points, lines, and polygons.

Although ArcGIS can be used to create raster layers, feature layers, and table views from netCDF data in ArcMap, or convert feature, raster, and table data to netCDF, what is needed is a toolset for further utilizing the capabilities of ArcMap with netCDF data.

SUMMARY

To address the above-stated needs, the present embodiment is configured to, for example, but not limited to, compare observational data to model data in a graphical manner, and maintain the security classifications for each layer in ArcMap so that the highest security classification of the data being viewed is known at all times. Further, the density and sizes of wind and water symbols can be automatically adjusted based on the zoom level of the view, a longitude-latitude grid can be overlaid over the map, and the grid can be automatically adjusted based on the zoom level of the map. Finally, the regions identified by the netCDF files included in the model directories can be displayed in ArcMap, the regions can be color-coded, and the region being accessed can be highlighted.

One embodiment includes a method for creating a vertical cross section on a map including, but not limited to, the steps of receiving a cross section maximum depth and a cross section slice location, creating a data frame in a conventional geospatial processing computer program, accessing selected netCDF data from a numerical model, the selected netCDF data coinciding with a cross section line along the cross section slice location to the cross section maximum depth interpolating between the selected netCDF data points along the cross section line if necessary, creating a raster pixel-by-pixel using the selected netCDF data and, if necessary, the interpolated data along the cross section line, adding the raster to the data frame, indicating the cross-section slice location on the map, creating an X-axis and a Y-axis and adding the X-axis and Y-axis to a cross section display, adding a title to the cross section display, setting a color scheme of the raster, and creating a window to focus on the cross section slice location on the map. The method can optionally include the steps of receiving a cross section contour line switch and a cross section bathymetry switch, adding contouring to the raster if the cross section contour line switch is on, creating a bathymetry layer, and adding the bathymetry layer if the cross section bathymetry switch is on.

In another embodiment, a method for displaying profile data can include, but is not limited to including, the steps of receiving profile information, storing the profile information in a shapefile, adding the profile shapefile to a profile layer on the map, and adjusting symbols based on the age of the profile information. The method can optionally include the steps of receiving a selected model data location of the numerical model data, receiving a selected profile location of a profile observation, adding a marker to the map to denote the model data location and the profile location, accessing the profile observation and the selected numerical model data, graphing the profile observation and the selected numerical model data on a chart.

In yet another embodiment, a method for analyzing profile observations and numerical model comparisons can include, but is not limited to including, the steps of parsing matchup data associated with the profile observation and the selected numerical model data, performing statistics on the parsed matchup data (avg diff, RMS diff, correlation coeff) in daily, weekly, monthly, quarterly, and yearly groupings, and displaying profile and bar graphs based on the parsed matchup data, the profile observation, and the selected numerical model data.

In another embodiment, a method for displaying altimetry data can include, but is not limited to including, the steps of receiving altimetry data, storing the altimetry data in a shapefile, adding the shapefile as a layer on a map, and adjusting symbols based on the sea surface height of the altimetry data. The method can optionally include the steps of receiving an altimetry point range, accessing the altimetry data based on the altimetry point range, adding the altimetry data to the map, and coloring the altimetry data in the chart the same as the map altimetry data.

In still another embodiment, a method for performing multiple add layer operations can include, but is not limited to including, the steps of receiving a list of user-defined add layer operations, saving the operation list, and executing the user-defined add layer operations from the operation list. The method can optionally include the steps of determining the security classification of at least one layer added during the step of executing, appending the security classification of the at least one layer to a name of the at least one layer, and if the security classification is higher than a displayed highest security classification, updating the displayed highest security classification with the security classification. The step of determining the security classification can include, but is not limited to including, the step of selecting a means for said determining the security classification from a group consisting of retrieving the security classification from the selected numerical model data and accepting the security classification from a user.

In another embodiment, a method for maintaining a security classification for visible layers can include, but is not limited to including, the steps of determining the visible layers of a map, determining at least one security classification of selected numerical model data associated with the visible layers, adding at least one classification layer to the map, the at least one classification layer having a name based on the determined at least one security classification, updating the security classification of the map based on the determined at least one security classification, maintaining the displayed security classification on the map as the map changes and as the determined at least one security classification changes, and displaying the highest security classification of the visible layers.

In another embodiment, a method for creating a vector layer using numerical model data can include, but is not limited to including, the steps of verifying that the numerical model data includes u- and v-component data, creating a u-component raster layer containing the u-component data, creating a v-component raster layer containing the v-component data, calculating magnitude and direction information from pixel data from the u-component and v-component raster layers, storing the magnitude and direction in a shapefile, and creating a symbol layer based on the shapefile. The method can optionally include the steps of receiving symbol shape information, adjusting symbols in the symbol layer based on the symbol shape information, and adjusting characteristics of the symbols based on the zoom level of the map.

In another embodiment, a method for displaying numerical model data coverage can include, but is not limited to including, the steps of storing regional bounds of latitude and longitude from the numerical model data in a shapefile, and adding a layer based on the shapefile.

In another embodiment, an automated method for creating a classified renderer can include, but is not limited to including, the steps of receiving the number of levels for the classified renderer, receiving a minimum value for a first pre-selected classification level, assigning a color for the first pre-selected classification level, receiving a maximum value for a second pre-selected classification level, assigning a color for the second pre-selected classification level, and creating the classified renderer by evenly dividing values between the first level and the second level, and by determining a color ramp between the first color and the second color.

In another embodiment, a method for adding hillshades for a raster layer can include, but is not limited to including, the steps of receiving any of azimuth, altitude, Z factor or model shadows, automatically creating a hillshade layer, automatically placing the hillshade layer under the selected raster layer, automatically grouping the hillshade layer with the selected raster layer, and automatically making the selected raster layer partially transparent.

In another embodiment, a method for automatically adjusting the size of symbols on a map can include, but is not limited to including, the steps of automatically determining a zoom level of the map, automatically determining a symbol size and a symbol density for the zoom level, and automatically adjusting a displayed size and a displayed density of the symbols on the map to the symbol size and the symbol density. The method can optionally include the steps of receiving a symbol color and a symbol direction, verifying that a selected layer contains vector data that can be adjusted, the selected layer having layer symbols, adjusting the displayed size and the displayed density of the layer symbols based on the symbol size and the symbol density for the zoom level, adjusting a displayed color of the layer symbols based on the symbol color, and adjusting the displayed direction of the layer symbols based on the symbol direction.

In another embodiment, a method for automatically adjusting the map grid density can include, but is not limited to including, the steps of automatically determining a displayed zoom level of the map, automatically determining a zoom level number of grid lines for the displayed zoom level, and automatically adjusting the displayed number of grid lines based on the zoom level number of grid lines.

In another embodiment, a method for adjusting the units of data involving a raster can include, but is not limited to including, the steps of automatically determining displayed data units associated with the raster, automatically determining an optimum data unit conversion, automatically converting the data according to the optimum data unit conversion, and automatically adjusting the raster based on the converted data.

In another embodiment, a method for adjusting a symbol layer having values comparing the observed data and model data can include, but is not limited to including, the steps of verifying that the symbol layer includes matchup data that can be adjusted, displaying a user menu including model date, variable, statistic, model depth and model TAU, the user menu based on the values, receiving selections based on the user menu, and adjusting the symbol layer based on the selections.

DETAILED DESCRIPTION

Figure 1A:
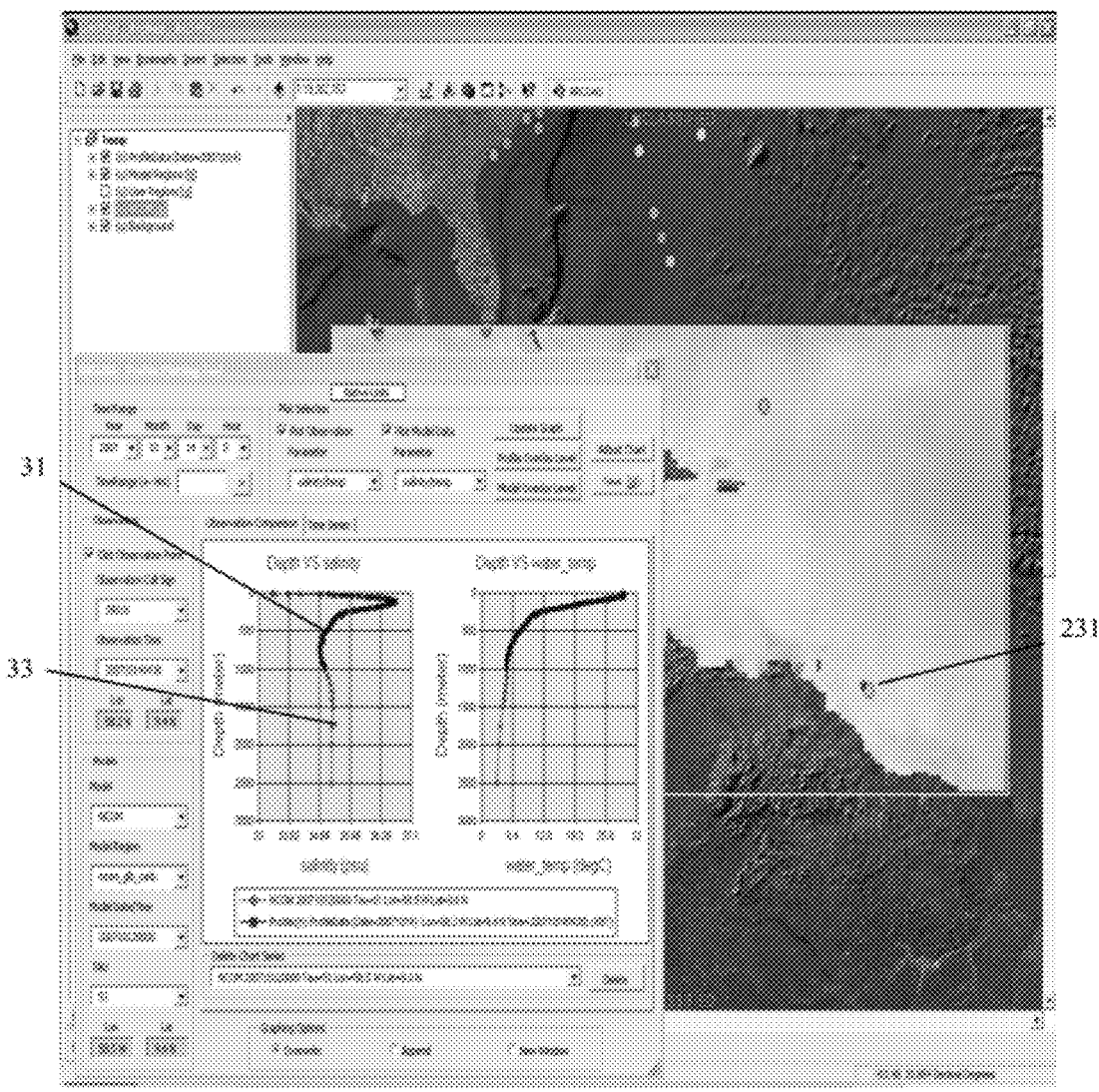
FIG. 1A is a screen shot of profile plots of the present embodiment.

The problems set forth above as well as further and other problems are solved by the present teachings. These solutions and other advantages are achieved by the various embodiments of the teachings described herein below.

To create a workspace in the present embodiment, ArcMap is activated, and an existing map or new empty map is opened or created. A file system location for storing the layer information is identified, and directory locations for the netCDF files being accessed are entered along with a date range. By setting the earliest date to nothing, all files in the model directories prior to and including the latest date can be processed and accessible. In the present embodiment, layer adding tools can be used to add raster and feature layers to ArcMap, layer adjusting tools can manipulate the layers, analysis tools can be used to compare data added by the other tools, and maintenance tools can provide access to settings and features that make the other tools easier to use.

To create new layers in ArcMap by accessing netCDF files, the add layer tool creates a raster layer based on a selected parameter, depth, and TAU, optionally creates contours for a raster layer, optionally adds wind or water symbols for parameters associated with magnitude and direction parameters in a netCDF file, optionally adds wind or water symbols by calculating the magnitude and direction based on u/v components from a netCDF file, and optionally adds a soundspeed raster layer by calculating the soundspeed using water temperature and salinity parameters. In the present embodiment, the parameter name is used to identify which function is being performed by the tool. If the parameter ends with "_mag/dir", symbols will be created based on magnitude and direction parameters from the netCDF file. If the parameter ends with "_u/v", symbols will be created based on calculations for magnitude and direction from u/v components in the netCDF file. If the parameter ends with "_soundspeed", a raster layer will be created based on calculations for soundspeed from water temperature and salinity components in the netCDF file. The magnitude, direction, u, and v components being searched for within the netCDF file are adjustable. Other parameters can signify that a raster layer will be created based on the parameter.

To select the netCDF file to base the layer being created, the file can be chosen by selecting the model that is associated with the netCDF file, followed by selecting the region encompassed by the netCDF file and finally the model's start date. Once the model is selected, the region can be selected by clicking on the map near the desired region. These three options (model, region, and start date) can narrow the available netCDF files to a single file for the parameter to be selected. Alternatively, the file browser can be used to locate the netCDF file required. Once the netCDF file being accessed is determined, the parameter being displayed can be selected followed by the depth/height and TAU of the parameter. If the parameter cannot be used to add symbols to ArcMap, a contour of the raster and the contour's interval can be included. If the parameter can be used to add symbols to ArcMap, the type of symbol being added can be identified, wind barbs or arrows can be added, and the maximum number of symbols to include in the layer can be limited, among other options. The units of the resulting layer can be determined and displayed. The units may be adjusted by, for example, but not limited to, clicking on the label at the top of the tool to switch between native netCDF units and converted units.

In the present embodiment, after the parameter is chosen and the options have been selected, the layer in ArcMap can be created. The coloring scheme for a raster can be specified. For example, for the rasters displayed with a stretch renderer, the high and low values can be based on the values in the netCDF file for the parameter. Symbol density and size can be adjusted based on the current zoom level. Manual adjustments to the symbols can be made possible. A raster with a size smaller than the netCDF region can be created. A copy of the layer can be saved as a JPEG file.

In the present embodiment, a raster layer can be created in ArcMap that displays the differences between two parameters. The difference can be based on, for example, comparing the same parameter for different depths/heights or different TAUs, or the difference can be based on any two parameters from any two models as long as the models' regions overlap. The depths and TAUs difference operations can simplify the selections when the same parameter is being compared based on different depths/heights or TAUs, respectively. To select the netCDF files being used to create the difference layer, the models that are associated with the netCDF files can be selected, followed by selecting the regions encompassed by the netCDF file and the models' start date. After the model is selected, the region can be selected. The parameters being compared can be selected along with the depth/height and TAU of each parameter. The coloring scheme for the difference raster can be specified. For the rasters displayed with a stretch renderer, the high and low values can be based on, for example, the differenced values in the raster. A copy of the layer can be saved, for example, as a JPEG file. In the present embodiment, displayed values can be converted between the netCDF files native units and converted units.

A statistical layer can be created in ArcMap by calculating, for example, but not limited to, the mean, variance, and standard deviation of a parameter's value over a series of TAU values. To select the netCDF files being used to create the statistical layer, for example, the model that is associated with the netCDF file, the region encompassed by the netCDF file, and the model's start date can be selected. After the netCDF file being accessed is determined, the parameter that the statistic is based upon and the depth/height of the parameter can be selected. The TAU values being used for the statistic's calculation can be determined by, for example, but not limited to, a TAU range string. A range creation tool can be provided to help create a valid TAU range. After the parameter has been chosen and the TAU range has been entered, the layer in ArcMap can be created and the coloring scheme for a raster can be specified. For the rasters displayed with a stretch renderer, the high and low values can be, for example, based on the values in the raster. Symbol density and size can be adjusted based on the current zoom level. Manual adjustments to the symbols can be possible. The option is provided to convert all of the values displayed by the ARCOAS tools between the netCDF files native units and converted units. By clicking on the label at the top of the tool, this option switches between the native units and converted units. The resulting layer will also be in the units chosen.

In the present embodiment, observation files can be read and their results can be displayed in ArcMap as profiles. The file formats can be, for example, but not limited to, binary containing profile data, binary and ASCII files containing altimeter data, binary, ASCII, and netCDF files containing sea surface temperature data, and image files. An observation type can be chosen, a single file or multiple files can be processed at once. The present embodiment reads the observation file(s) and organizes the layers in ArcMap. The layers created can have points indicating the locations that the observations occurred. The profile points can be colored so that the newer observations are darker than the older observations. The altimeter points can be colored based on the sea surface height value, and the sea surface temperature points can be colored based on the sea surface temperature value. For sea surface temperature data, raster layers can be created and displayed in order to speed up the map refreshes. All of the data from the files can be contained in the created feature layers' table. Optionally, only the profile observations within the range of the model regions may be added to the feature layer.

A comma-separated valued (CSV) file can be read and the results can be displayed as a raster in ArcMap. The display field and cell size can be adjusted prior to layer creation. Multiple CSV files can be processed simultaneously. Longitude and latitude can be taken from the first CSV file in the list.

A wavelet file can be read and the results can be displayed as a raster in ArcMap. The resulting layer can be connected to the associated netCDF file and can be used to create cross-sections. The netCDF files created during the wavelet conversion process can be placed in the wavelet directory of the workspace and can be accessed later. The area of the wavelet file can be displayed in the map as a white rectangle. Optionally, the netCDF data can be restricted to a subset of the wavelet file by drawing a box with the mouse which is displayed in orange or set manually using the NetCDF extent boxes. Multiple wavelet files can be processed simultaneously by selecting multiple files from the file browser. The wavelet file can be converted to a netCDF file. The raster layer can be connected to the netCDF file and can be used to create a cross-section. The present embodiment can calculate the slope of an existing raster layer and display the results as a raster in ArcMap. The units for the output layer can be, for example, but not limited to, degrees, percentage, or Z factor which can adjust the output as well.

The present embodiment can set multiple raster layers with the same options simultaneously. For a stretch renderer type, the adjustable settings for the rasters can include the number of color ramps used by the stretch render, the maximum and minimum values for the raster and the colors associated with the maximum and minimum values for each color ramp. Setting both the maximum and minimum values to 0 can allow the selected rasters to adjust the high and low values based on the values within the rasters. The null value can be used to identify the value that will be ignored by the renderer and displayed with a transparent color. For a classified renderer type, the adjustable settings for the raster can include the number of classification levels being rendered as well as the maximum and minimum values for each classification level being rendered. In the present embodiment, a classified renderer can be created by selecting the number of levels for the classified renderer, inputting a minimum value for the top level, assigning a color for the top level, inputting a maximum value for the bottom level, and assigning a color for the bottom level. The classified renderer can be created by entering evenly divided values for each level and colors between the two colors selected.

In the present embodiment, a hillshade can be applied to a raster layer in a map allowing the azimuth, altitude, Z factor and model shadows to be adjusted. The azimuth is the angle of the light source and it is a value between 0° and 360° measured clockwise from north. The altitude is the angle of the light source above the horizon and it is a value between 0° and 90° with 0° being at the horizon and 90° being directly overhead. The Z factor is the number of ground x,y units in one surface z unit The z values can be multiplied by the Z factor when calculating the raster layer. The model shadows option can allow both local illumination angles and shadows to be considered for the output. The hillshade layer can be placed under the original raster layer and grouped with the original raster layer. The original raster layer can be made partially transparent so that the hillshade can be seen.

In the present embodiment, the density and size of the wind barb and arrow symbols can be changed if a layer containing wind barbs or arrows is visible in ArcMap. Further, in the present embodiment symbols can be thinned so that the focus can be placed on the symbols greater than some value. Still further, the color of the arrows can be adjusted, and the symbols in the selected layer can be flipped by 180°. In the present embodiment, the density of the grid overlaid on the map can be changed if the grid layer is visible in ArcMap, by enlarging or shrinking the gap between the grid lines. The matchup layer in ArcMap can be adjusted to display a statistic for a particular date and depth. The units of the data referenced by the layer can be converted.

Referring now to FIG. 1A, observational data 31 and model data 33 can be compared through the use of a plot. The locations of the observation data and model data are noted in the map by a marker and highlighted observation point 231 (FIG. 1A). To produce a comparison plot, a profile layer must have been added to ArcMap. Plots can be produced whenever the mouse click is within range of either a profile point or the model's netCDF data. To restrict the profile and model data available for plotting, a time range can be adjusted. Selections of observations and model TAUs can be restricted to those that occur within the specified number of hours of a preselected date. The profile point being compared can be chosen either automatically or manually. The profile and model parameter being plotted can be selected independently with both being plotted if, for example, the parameters are the same, for example, salinity/temp or soundspeed. The graph can be refreshed with changed profile, model, or parameter information for the same longitude and latitude location as a previous plot. Statistics taken from the selected profile point or model can be added to the plot. The model data's longitude and latitude position can be determined by clicking the map. The closest model data point can be plotted along with the profile data, if applicable. The closest profile point to a clicked location can be chosen and the model data's point can be determined using the profile point's position rather than a clicked location.

Figure 1B:
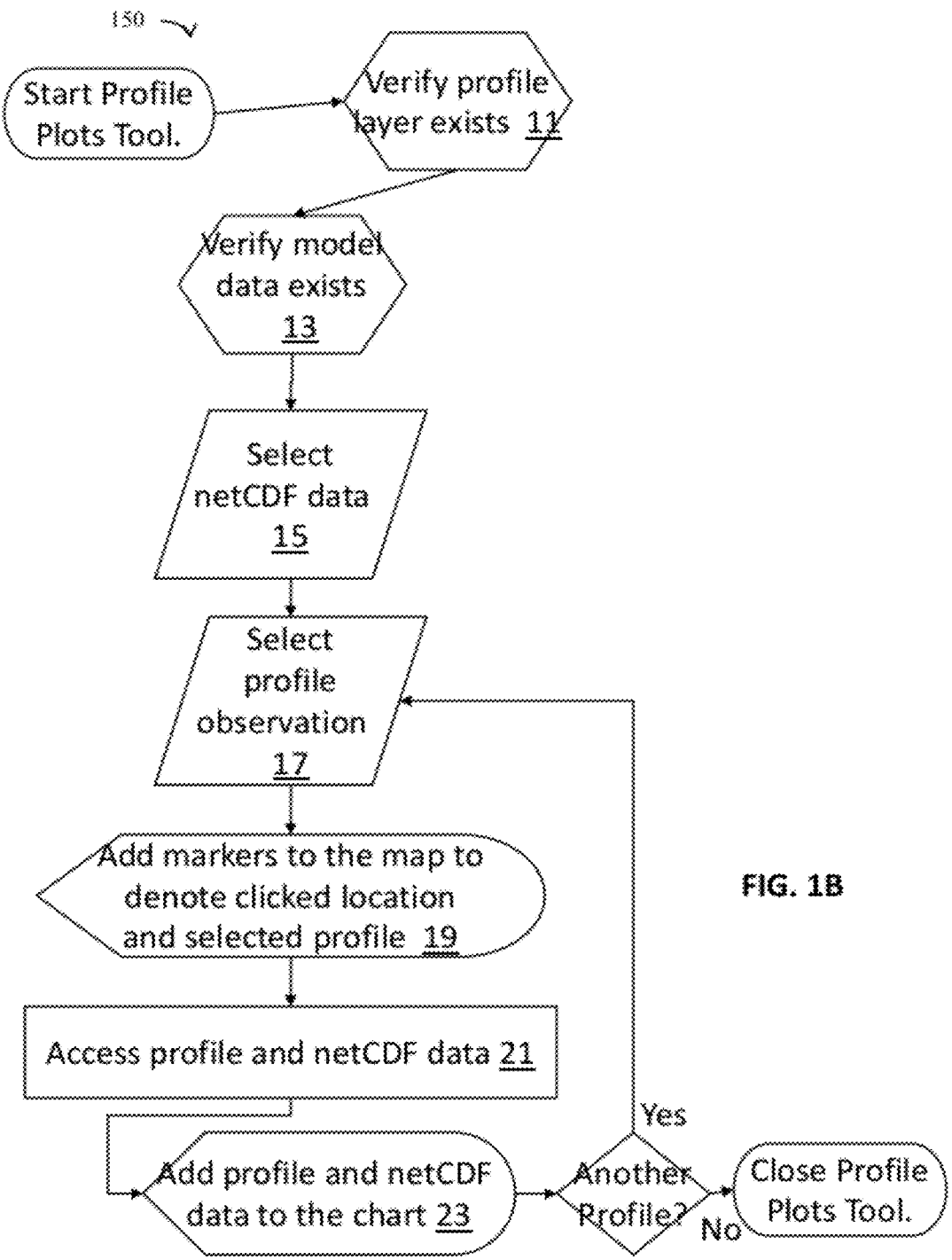
FIG. 1B is a schematic block diagram of the method for the profile plotting tool of the present embodiment.

Referring now to FIG. 1B, method 150 for plotting profile data can include, but is not limited to including, the steps of verifying 11 that a profile layer exists, verifying 13 that model data exists, selecting 15 netCDF data, selecting 17 profile observation, adding 19 markers to the map to denote clicked location and selected profile, accessing 21 profile and netCDF data, and adding 23 profile and netCDF data to the chart.

Figure 2A:
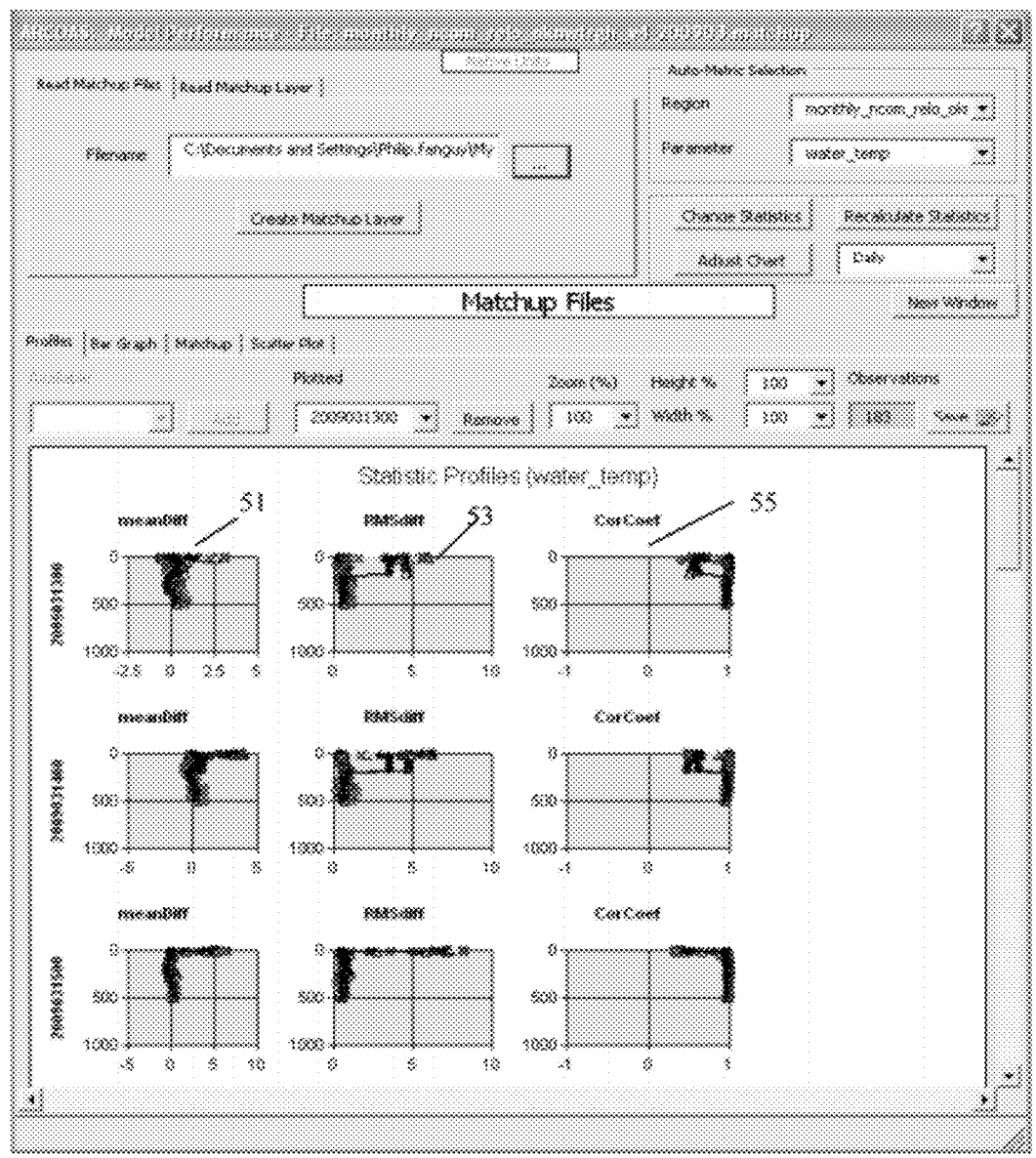
FIG. 2A is a screen shot of pre-calculated model-observation matchup data.
Figure 2B:
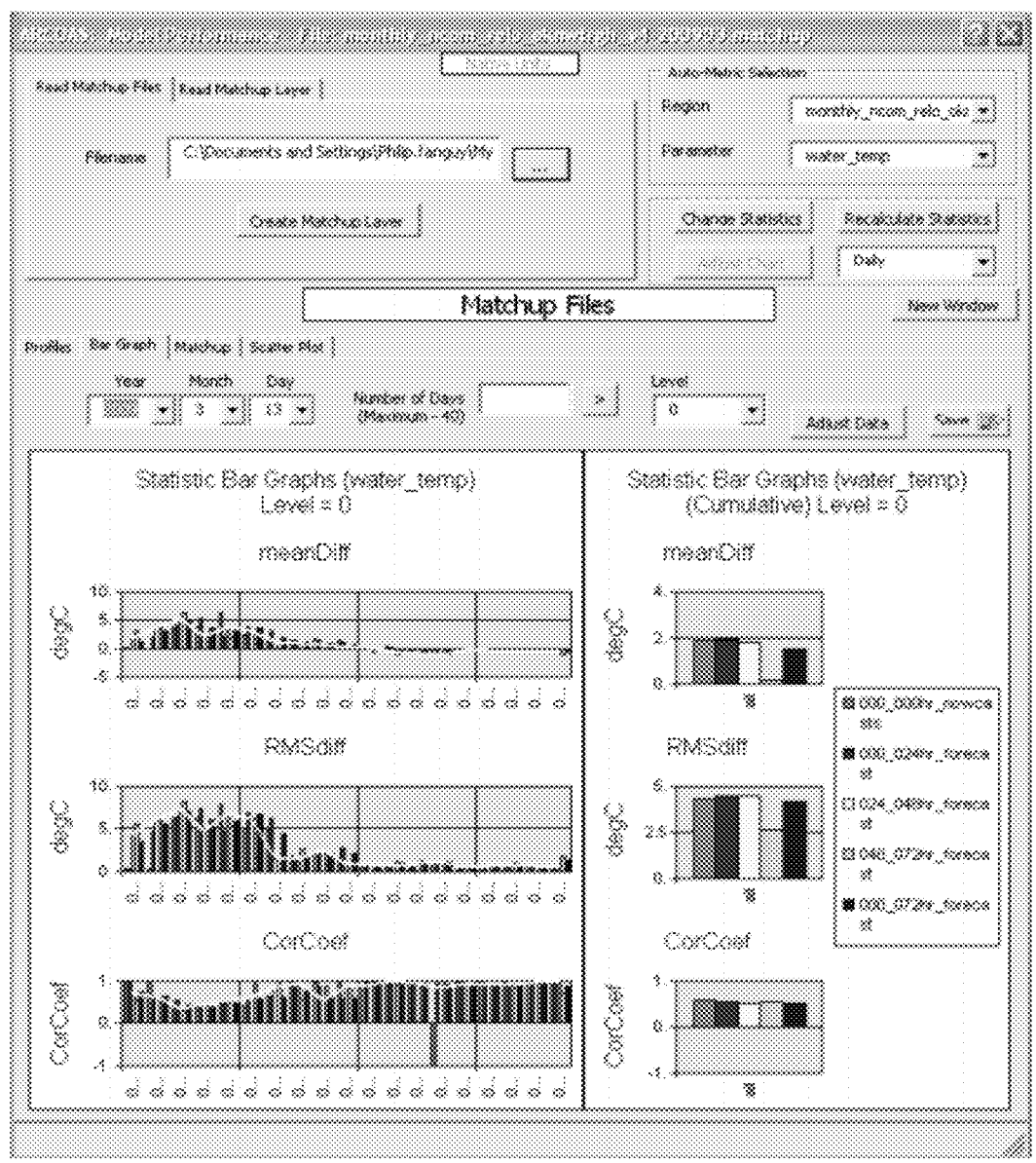
FIG. 2B is a screen shot of a model performance bar graph.

Referring now to FIG. 2A, pre-calculated model-observation matchup data as well as metrics calculated using this matchup information can be plotted. The displayed results can then be used to compare observational data to model data. Several statistics, for example, but not limited to, mean error 51, rms error 53, and correlation coefficient 55, can be calculated from the matchup data for the forecasts. Region and parameter selection boxes can be populated, and the graphs for the selection are plotted, based on the statistics calculations. As the region and parameters are adjusted, so are the graphs. The display of the statistics can be based on grouping the data by day, week, month, quarter, or year. If the matchup data is loaded using matchup files, it is possible to create a matchup layer. The layer created has points indicating the locations that the observations matchups occurred. The points can be colored so that, for example, the values near 0 are white, negative values are shades of red, and positive values are shades of green. Points with invalid matchup values can be marked with a circled X. All of the matchup data from the file(s) can be contained in the created feature layer's table. Referring now to FIG. 2B, bar graphs over dates for the Mean Error, RMS Error, and Correlation Coefficient for a selected depth level can be displayed. The dates being displayed can be adjusted.

Figure 2C:
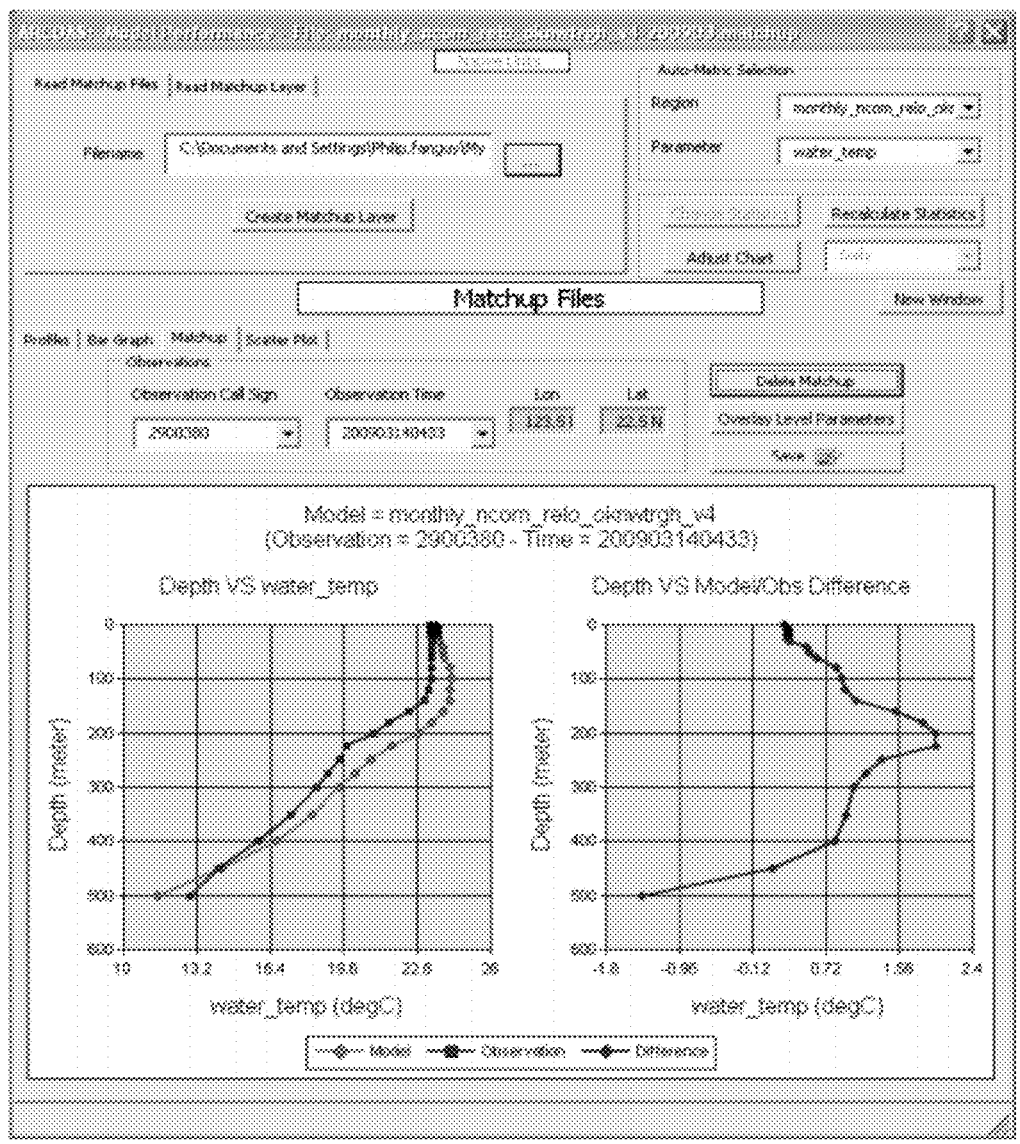
FIG. 2C is a screen shot of a model performance matchup graph.

Referring now to FIG. 2C, the actual values from the model and the observations as well as the differences between these values for every depth can be displayed. The data is organized based on the observation call sign and observation time. Additional information can be overlaid in the graph, for example, sonic layer depth and surface elevation. If the matchup data has been read from a matchup layer, the selected observation can be highlighted in ArcMap. A matchup can be deleted to remove the matchup from the scatter plot calculations, but not the pre-calculated profile graphs. If a matchup layer is created after the matchup deletion, the deleted matchup may not be contained in the matchup layer.

Figure 2D:
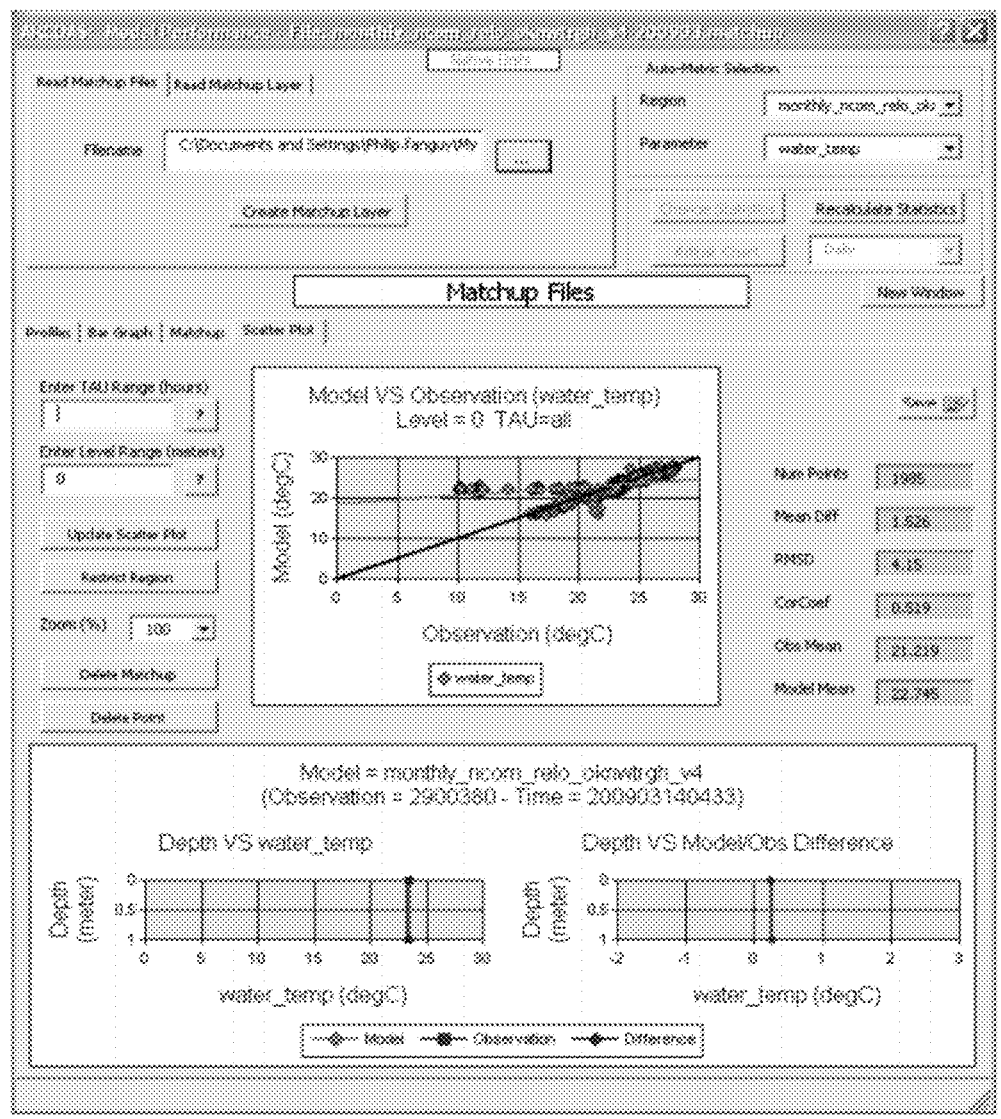
FIG. 2D is a screen shot of a model performance scatter plot.

Referring now to FIG. 2D, a comparison between the model value and the observation value for every matchup point can be displayed as a scatter plot. A line with a slope of one and a trend line for the data can be provided for reference. The mean difference, RMS difference, and correlation coefficient statistics can be calculated based on the points included in the scatter plot. The points included in the scatter plot can be adjusted by, for example, changing the TAU range and/or the level range. A second matchup graph can display the matchup values for a particular point in the scatter plot. A point can be selected in the scatter plot by hovering the mouse over the desired point. The second matchup graph can switch to the selected observation with the graph focused on the point's depth. A copy of the any of the graphs can be saved as an image file in, for example, but not limited to, GIF, JPG, PNG, or CSV format.

Figure 2E:
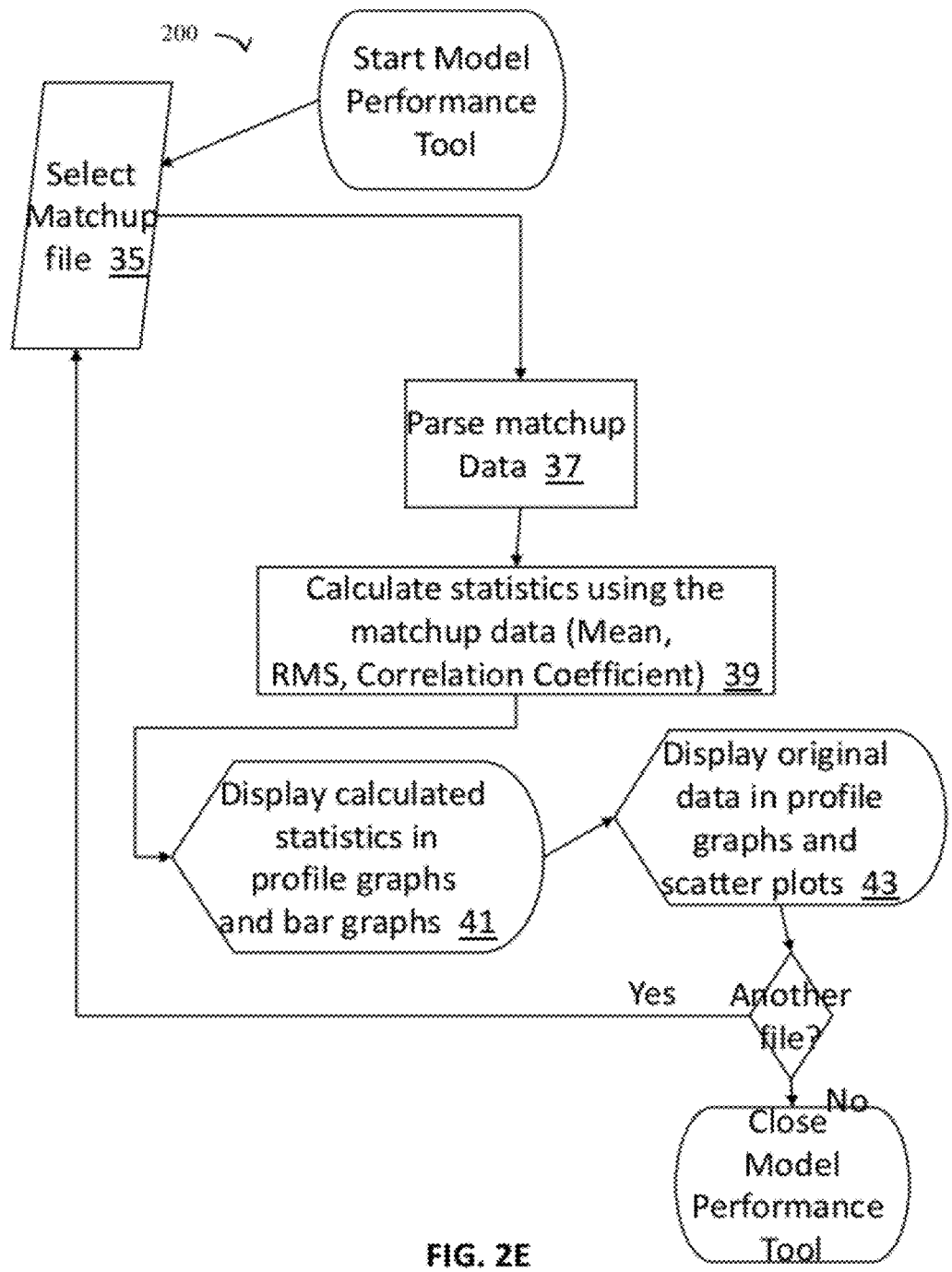
FIG. 2E is a schematic block diagram of the method for the performance model tool of the present embodiment.

Referring now to FIG. 2E, method 200 for plotting model-observation matchup data can include, but is not limited to including, the steps of parsing 37 matchup data, calculating 39 statistics using the matchup data (for example, but not limited to, mean, RMS, correlation coefficient), displaying 41 calculated statistics in profile graphs and bar graphs, and displaying 43 original data in profile graphs and scatter plots.

Figure 3A:
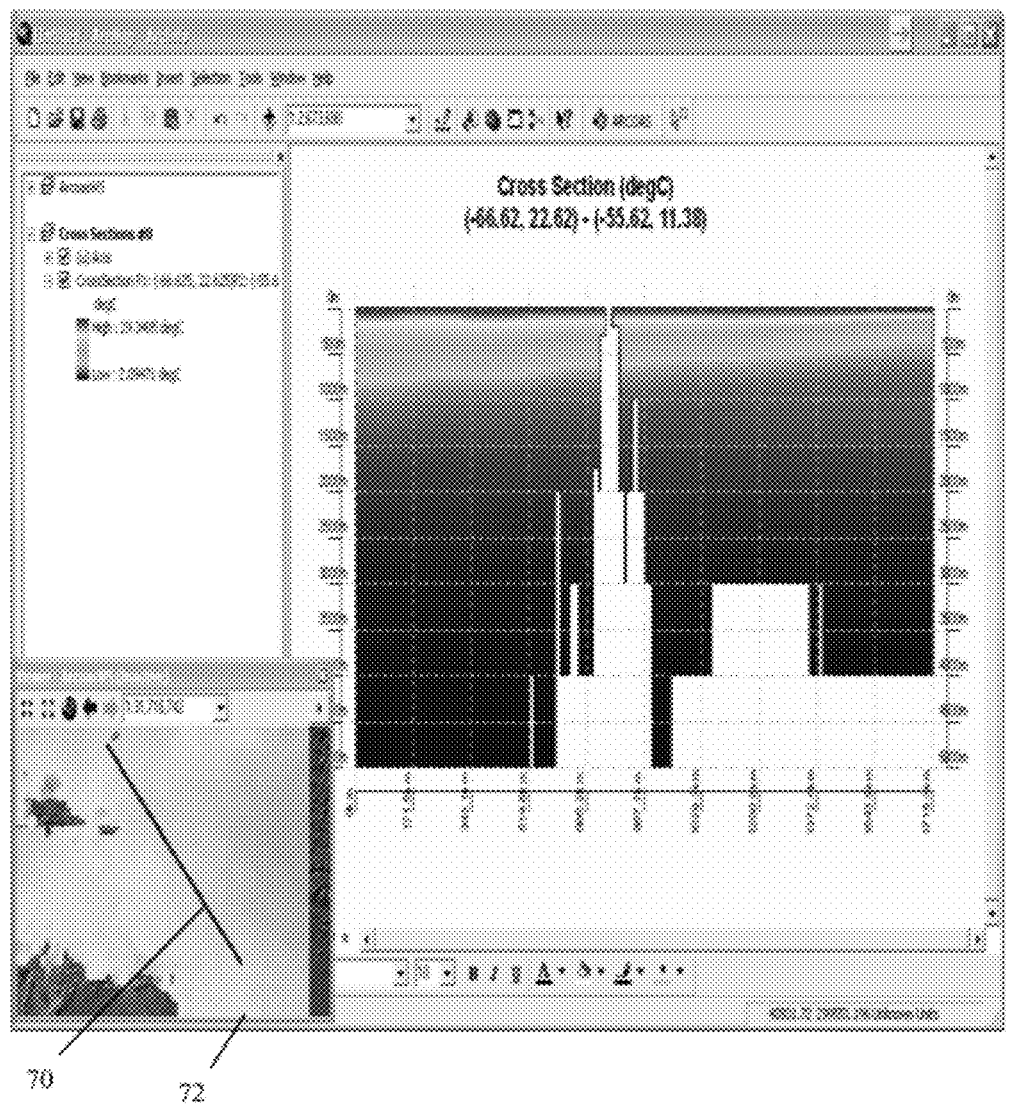
FIG. 3A is a screen shot of cross section creation.

Referring now to FIG. 3A, a cross section of an existing netCDF raster layer can be created that can display the raster's values along a line for all of the netCDF file's depths. Multiple cross section results can exist simultaneously. A raster layer that remains connected to the netCDF file can be created. A maximum depth for the cross section is determined and a line delineating the location of the cross section can be made, for example, using a mouse. Contours can be added to the cross section. The resulting cross section can be displayed in a separate data frame from the existing layers. Included in the display of the cross section can be window 72 which can display the location of cross section line 70 on the original map. Cross section line 70 can be displayed with a number to indicate to which cross section it pertains. Deleting the cross section frame can delete cross section line 70 from the original map.

Figure 3B:
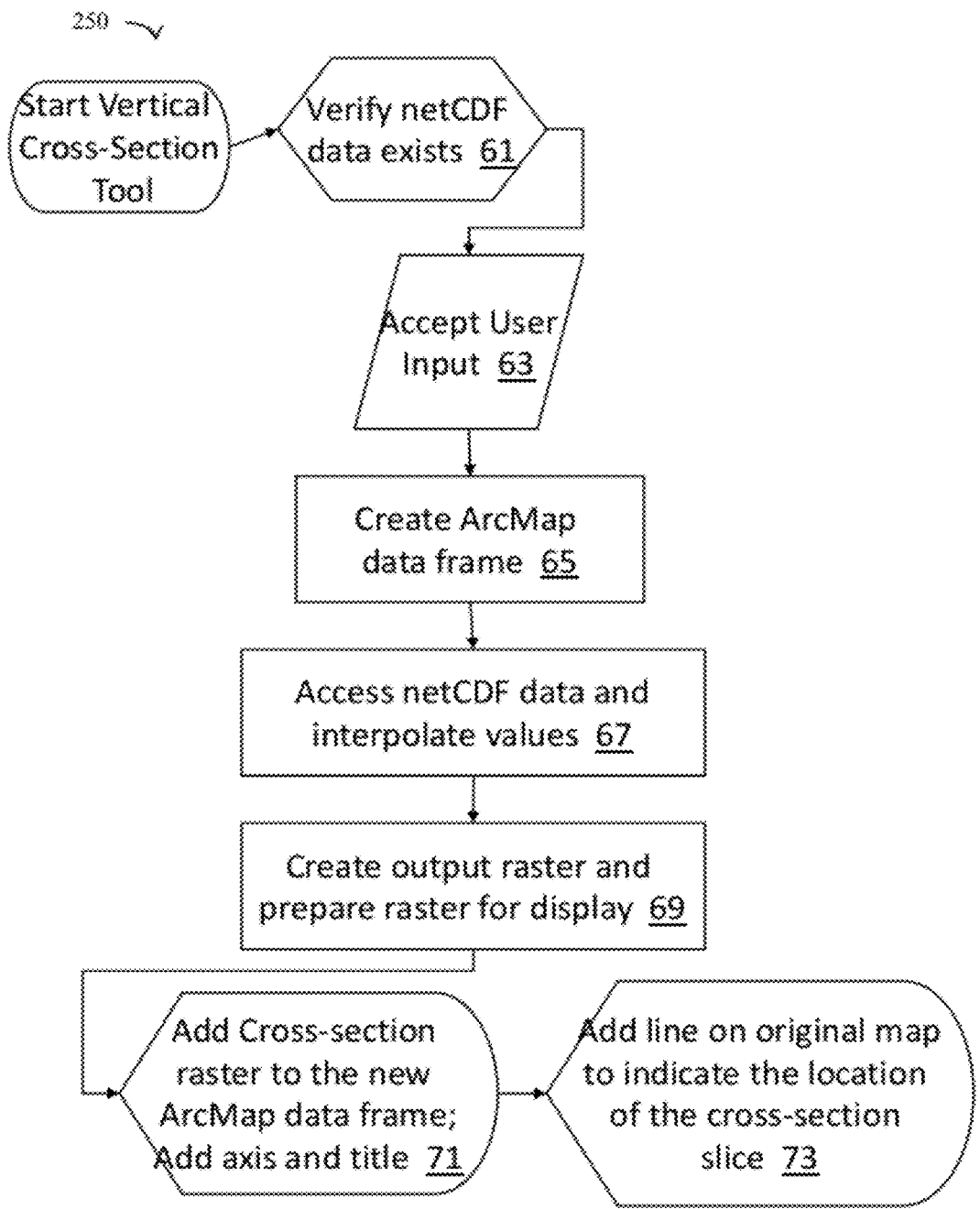
FIG. 3B is a flowchart of the method of the vertical cross section tool of the present embodiment.

Referring now primarily to FIG. 3B, method 250 for creating a vertical cross section can include, but is not limited to including, the steps of verifying 61 that net CDF data exists, accepting 63 user input with respect to the location of the desired cross section, accessing 67 the netCDF data and interpolating values in the location of the desired cross section, creating 69 an output raster and preparing the raster for display, adding 71 a cross section raster to a new ArcMap dataframe, and adding an axis and title, and adding 73 line 70 on the original map to indicate the location of the cross section slice.

Figure 4A:
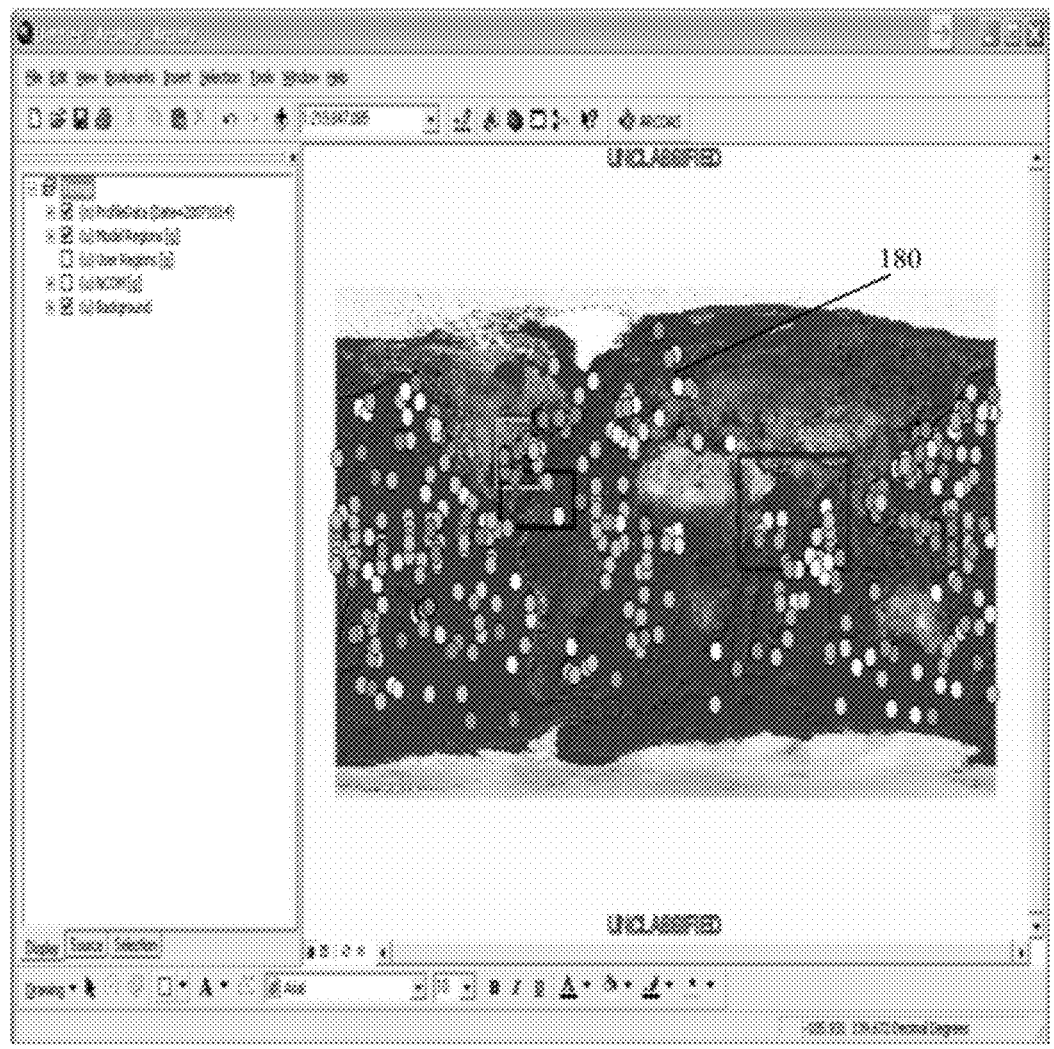
FIG. 4A is a screen shot of profile observation locations.

Referring now to FIG. 4A, observation files can be read and the results can be displayed in ArcMap. The file formats supported can be, for example, but not limited to, binary files containing profile data, binary and ASCII files containing altimeter data, binary, ASCII, and netCDF files containing sea surface temperature data, and image files. An observation type can be read, and a single file or multiple files can be processed at once. The observation file(s) can be organized in layers in ArcMap. The layers created can have profile points 180 indicating the locations that the observations occurred. Profile points 180 can be colored so that the newer observations can be darker than the older observations. Altimeter points can be colored based on the sea surface height value, and the sea surface temperature points can be colored based on the sea surface temperature value. For sea surface temperature data, raster layers can be created and displayed in order to speed up the map refreshes. Data from the files can be contained in the created feature layers' table, and these data can be restricted to data within the range of the model regions.

Figure 4B:
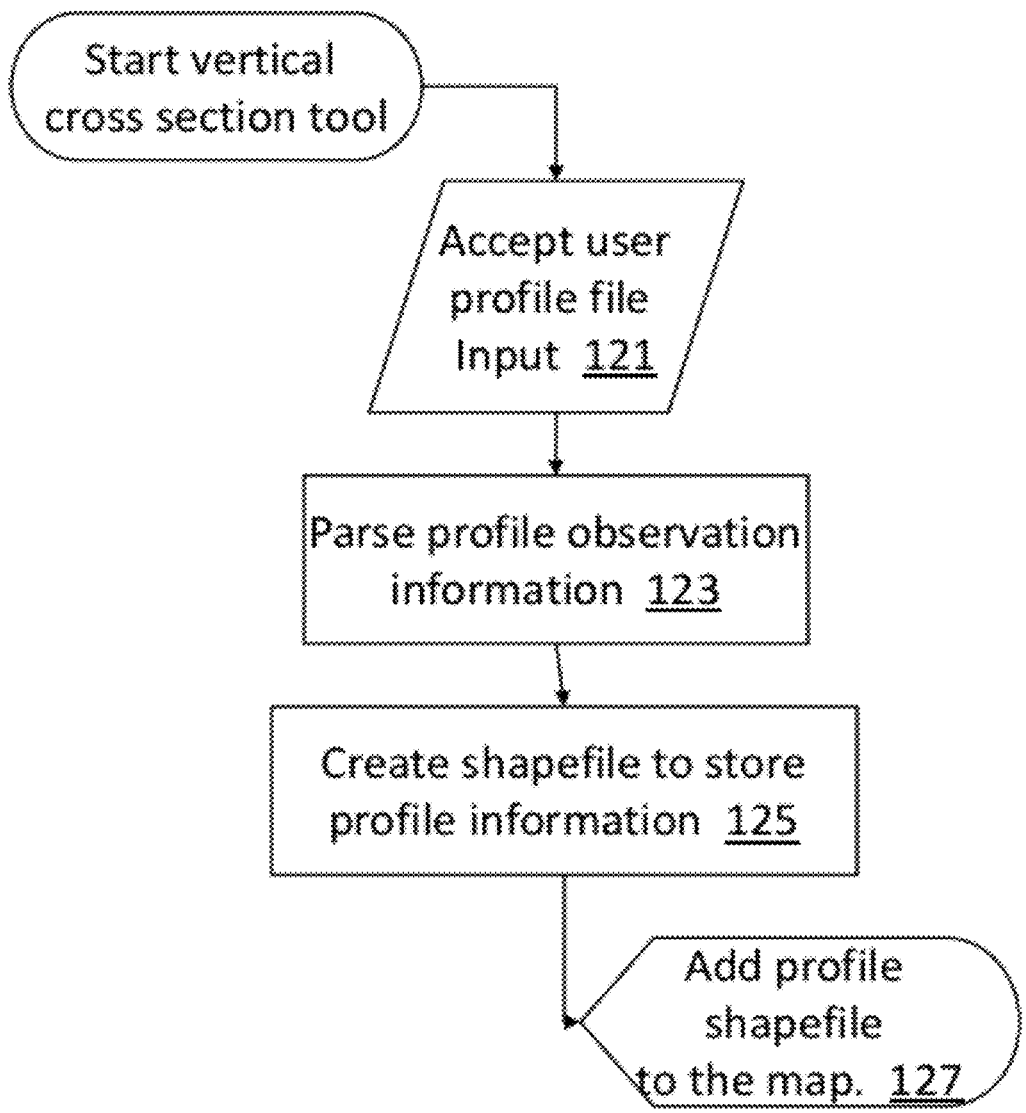
FIG. 4B is a schematic block diagram of the method for processing profile observation.

Referring now to FIG. 4B, method 250A for processing profile observation data can include, but is not limited to including, the steps of accepting 121 user input associated with selecting profile observation data, parsing 123 profile observation information, creating 125 a shapefile to store profile information, and adding 127 the shapefile to the map.

Figure 5A:
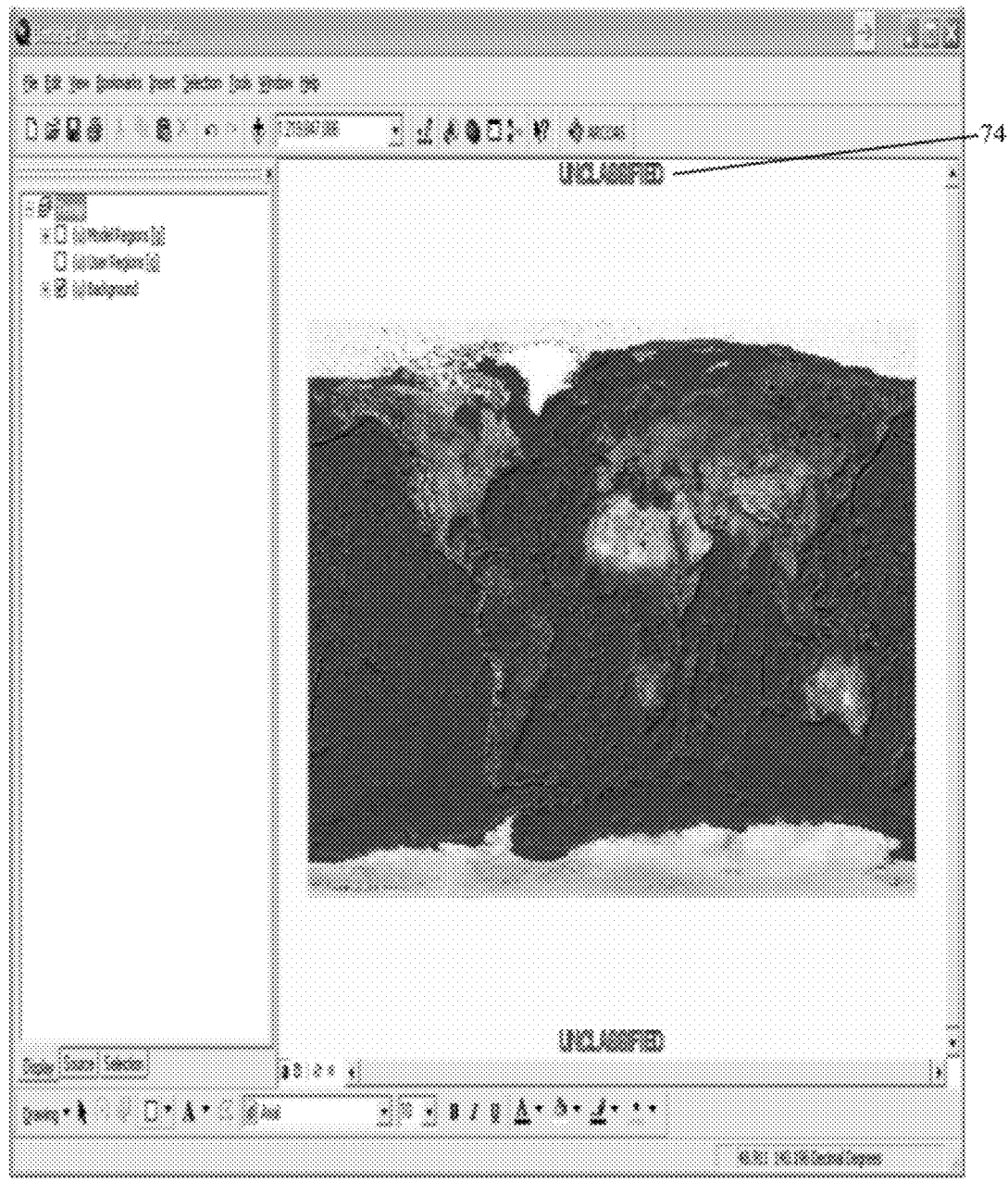
FIG. 5A is a screen shot of a security classification display.

Referring now to FIG. 5A, the map's and/or layer's current security classification can be changed to a new classification, for example, Unclassified, Confidential, Secret and Top Secret. Classification labels 74 overlaying the map can be disabled in ArcMap.

Figure 5B:
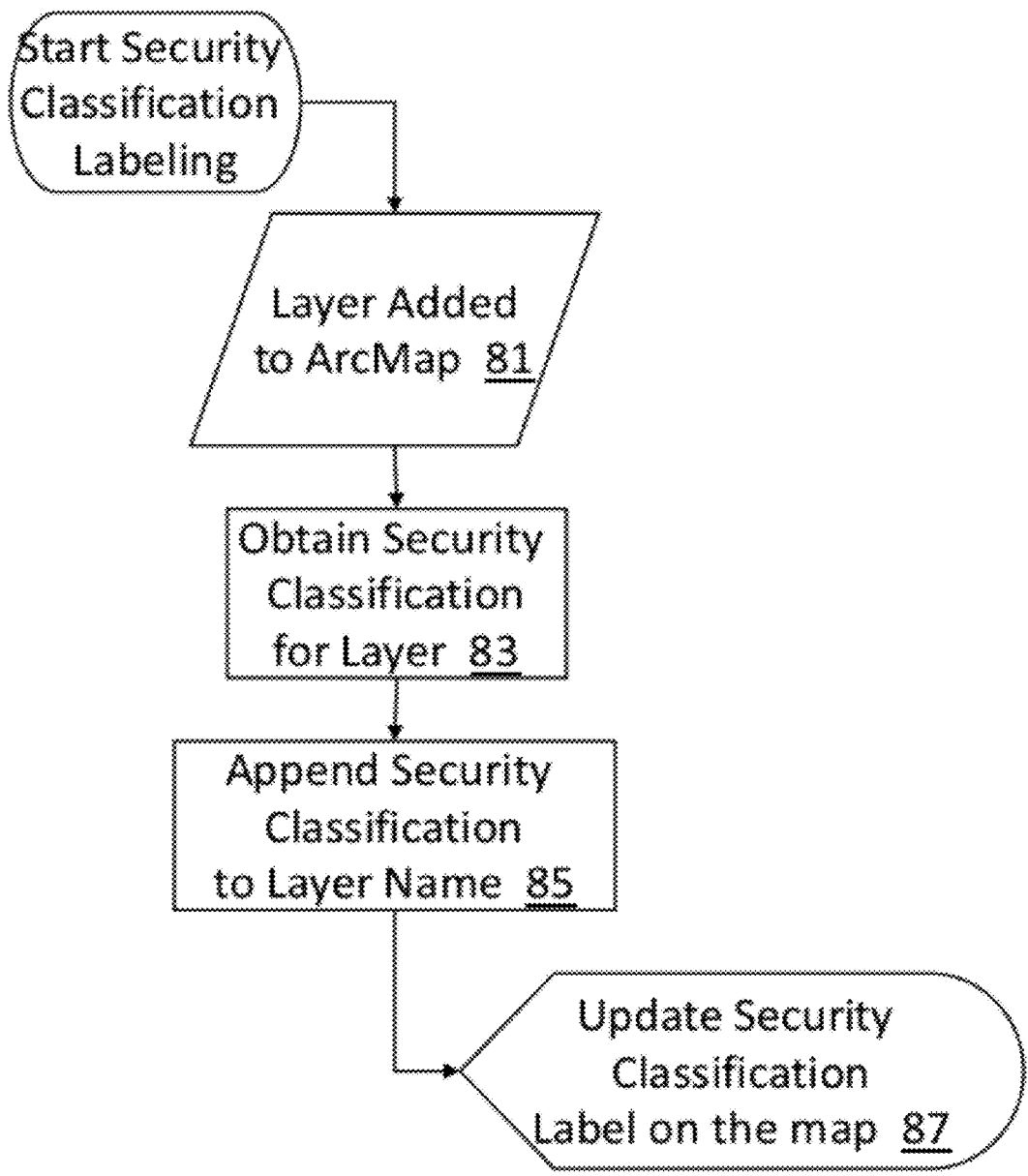
FIG. 5B is a schematic block diagram of the method for security classification labels.

Referring now primarily to FIG. 5B, method 300 for security classification labeling can include, but is not limited to including, adding 81 a layer to ArcMap, obtaining 83 a security classification for a layer, appending 85 the security classification to the name of the layer, and updating 87 security classification label 74 (FIG. 5A) on the map.

NetCDF file settings can include those options associated with the variables and attributes in the netCDF files. The settings can be used to search the netCDF files for specific information. The u-component and v-component settings can be used to search the netCDF file for two variables which are identical with the exception of the u- and v-components. If these two variables are located, the magnitude and direction can be calculated so that a vector layer can be added to ArcMap. Similarly, the magnitude component and direction component can be used to find two variables which are identical with the exception of the magnitude and direction components so that a vector layer can be added to ArcMap. The classification parameter can be used to locate the attribute for the security classification of the netCDF file. This security classification can be used as the security classification for the layers created from the netCDF file. The settings for a newly created raster can include the maximum and minimum values for the raster as well as the colors associated with the maximum and minimum values. Buttons to color selectors can be provided to help with entering the RGB values for the colors. Arrow symbol settings can be included so that the arrow font can be changed to the desired font. An option can be provided to allow adjustment of the size and density of the symbols based on the zoom level of ArcMap. The default maximum number of symbols created by the Add Layer tool can be adjusted.

Figure 6A:
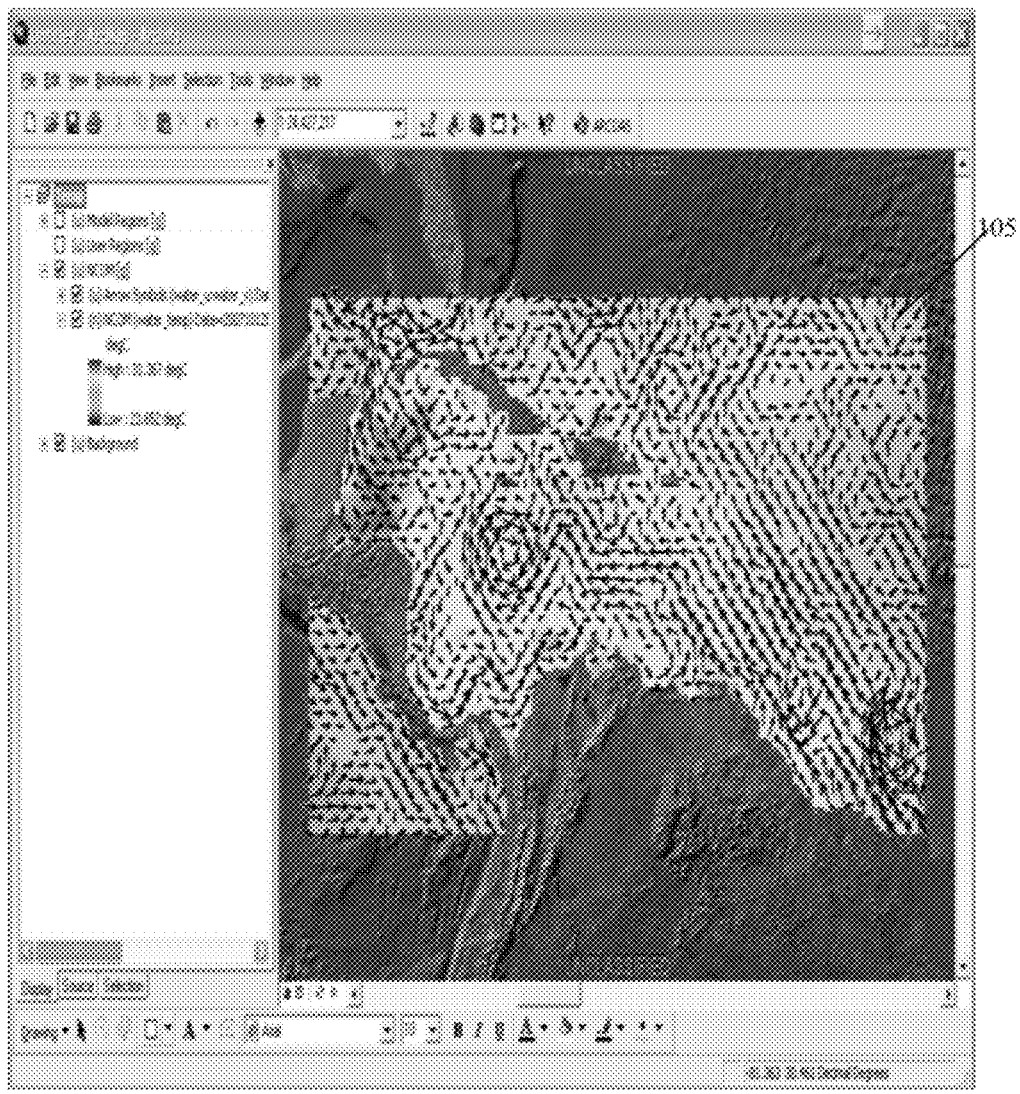
FIG. 6A is a screen shot of computed vectors.

Referring now to FIG. 6A, vectors 105 can be added if, for example, one of the following sets of variable is contained in a single netCDF file: u- and v-component variables, magnitude and direction variables, or direction variable only. Further, the variable names can be named similarly with a single part of the term differentiating between the two components, for example, water_u and water_v, water_mag and water_dir, etc., NetCDF settings can be set to identify the differentiating part of the variable correctly, for example, u-Component=_u, v-Component=_v, etc., and the parameter combo box in the model selection interface can be set to the variable ending with _u/v, _mag/dir, or the direction component. When a vector layer is created, the vector layer can be adjusted based on the zoom level to improve the display of the vectors. Vector layers can be adjusted when the map view changes based on the zoom level to improve the display of the vectors.

Figure 6B:
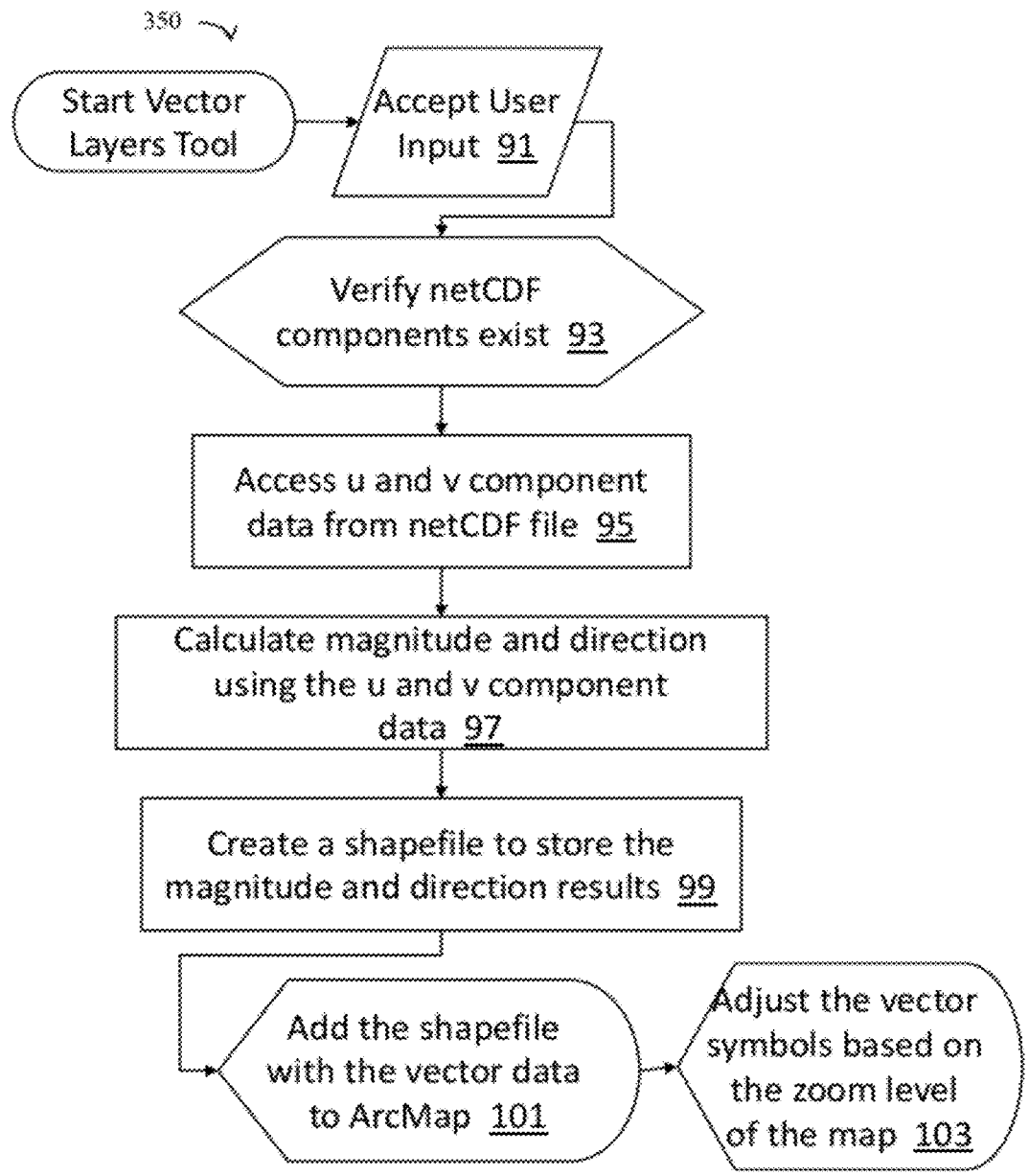
FIG. 6B is a schematic block diagram of the method for processing vector layers.

Referring now primarily to FIG. 6B, method 350 for creating vector layers can include, but is not limited to including, the steps of accepting 91 user input the delineating area in which the vector layer is to be created, verifying 93 that the necessary netCDF components exist, accessing 95 u- and v-component data from the netCDF file, calculating 97 magnitude and direction using the u- and v-component data, creating 99 a shapefile to store the magnitude and direction results, adding 101 the shapefile with the vector data to ArcMap, and adjusting 103 vector symbols 105 (FIG. 6A) based on the zoom level of the map.

Figure 7A:
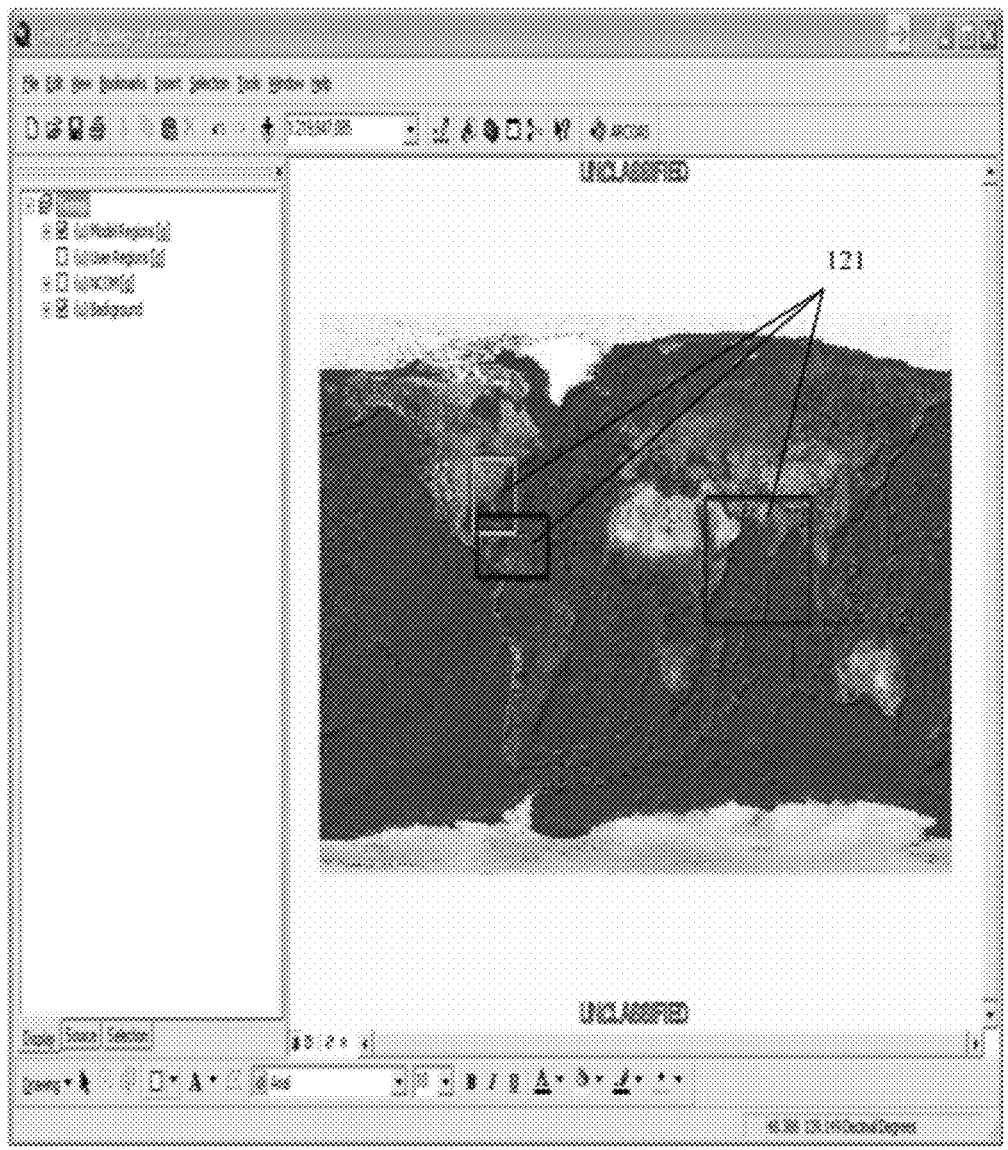
FIG. 7A is a screen shot of region boxes.

Referring now to FIG. 7A, when a longitude-latitude grid is overlaid over the map, and the grid is automatically adjusted based on the zoom level of the map, regions 121 identified by the netCDF files included in the model directories can be displayed in ArcMap. The regions can be color-coded based on the model name assigned during the setup process. The region being accessed can be highlighted. The netCDF file to base the layer being created can be chosen by selecting the model that is associated with the netCDF file, followed by selecting the region encompassed by the netCDF file and finally the model's start date. These three options—model, region, and start date—can narrow the available netCDF files to a single file for a parameter to be selected. The map view can be restricted to only the area being worked, and the map can be restricted to, for example, but not limited to, a predefined feature layer or to a custom extent defined by the user.

Figure 7B:
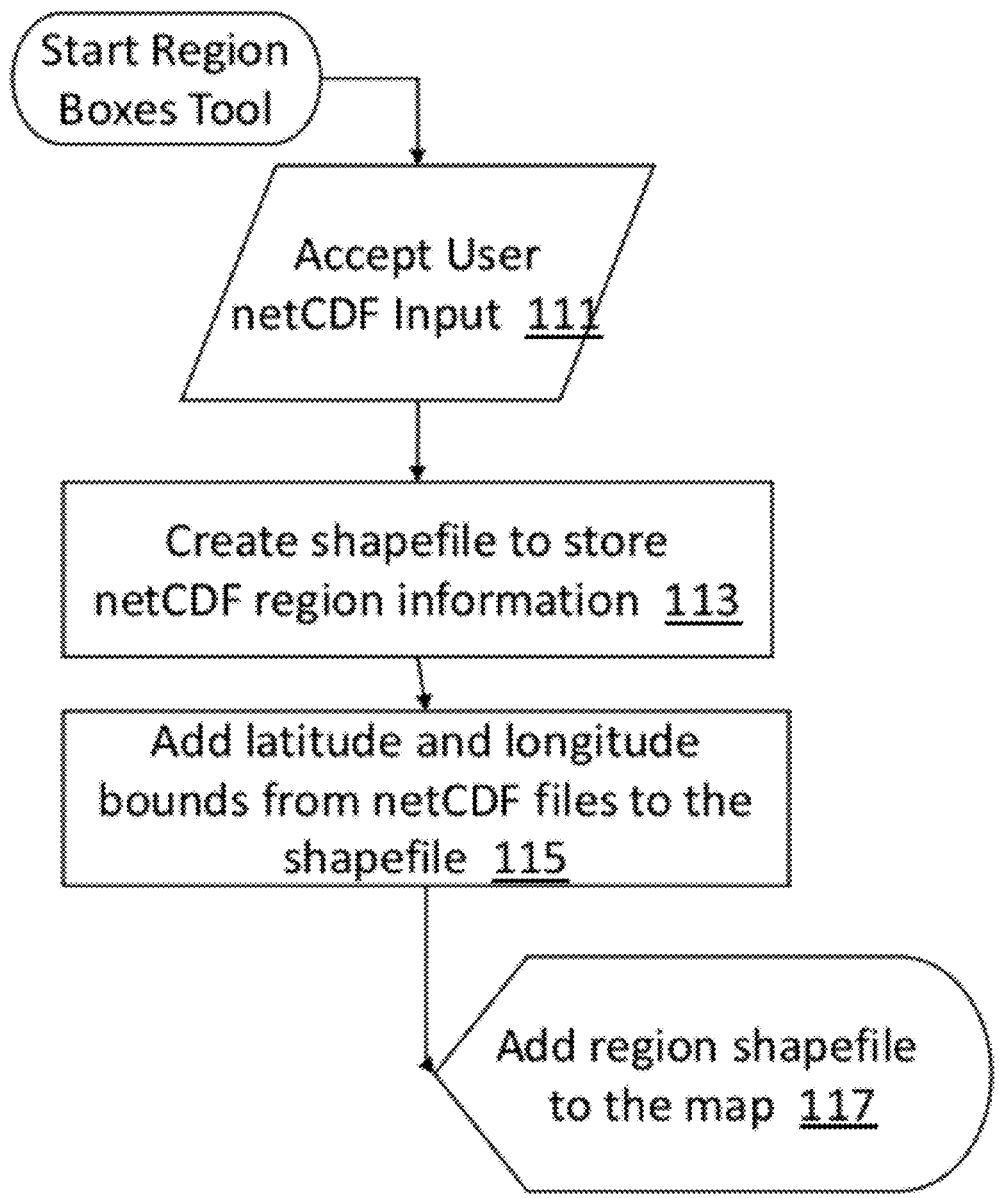
FIG. 7B is a schematic block diagram of the method for processing region boxes.

Referring now primarily to FIG. 7B, method 400 for creating region boxes can include, but is not limited to including, the steps of accepting 111 user input with respect to netCDF file locations, creating 113 a shapefile to store netCDF region information, adding 115 latitude and longitude bounds from netCDF files to the shapefile, and adding 117 the region shapefile to the map.

Figure 8A:
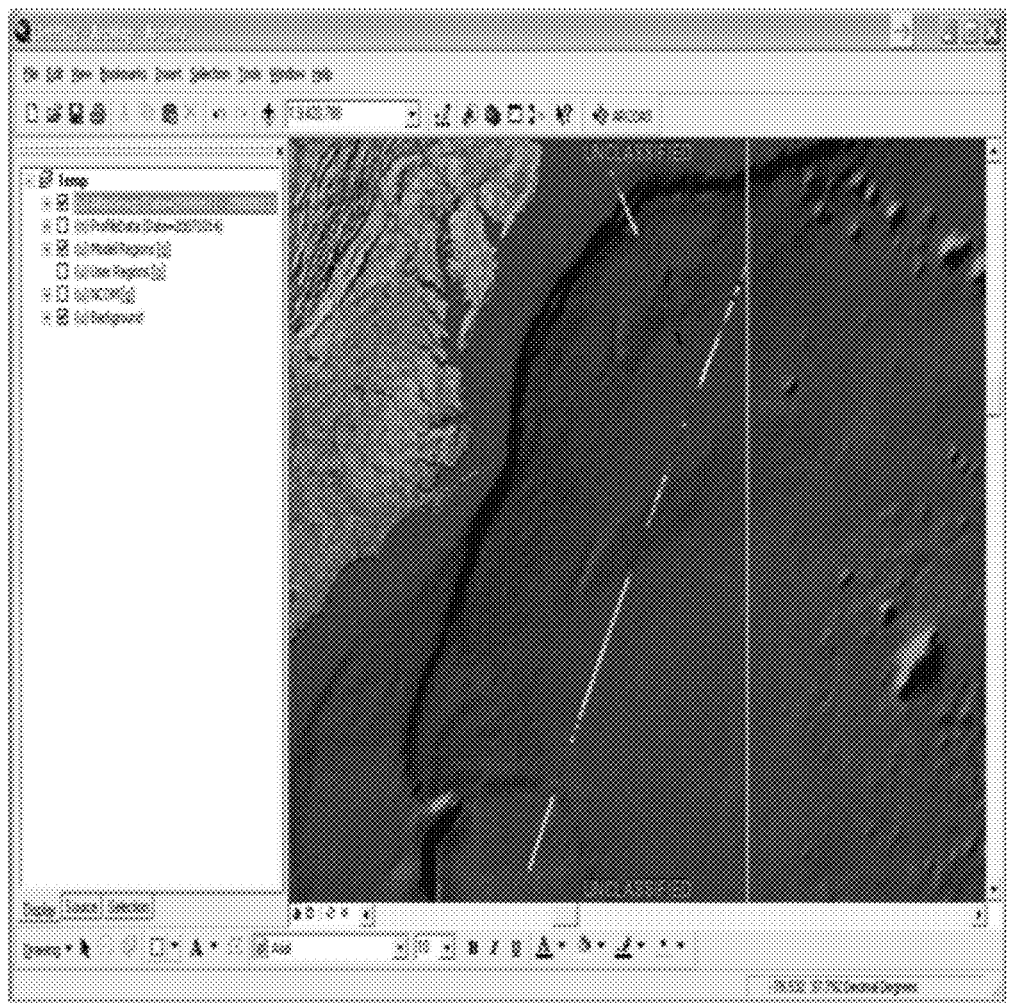
FIG. 8A is a screen shot of altimetry data positions.
Figure 8B:
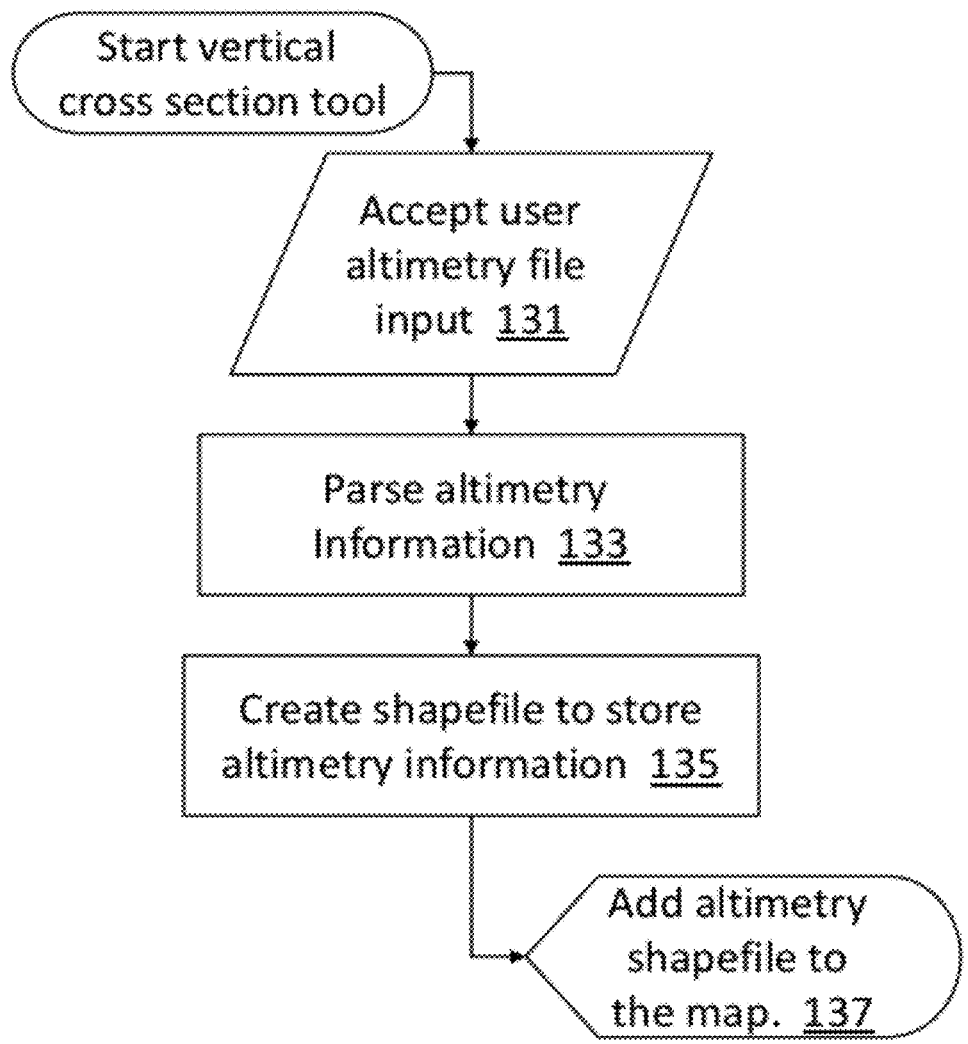
FIG. 8B is a schematic block diagram of the method for processing altimetry files.

Referring now to FIG. 8A, altimetry observation layers are displayed after their addition to ArcMap. Referring now to FIG. 8B, method 450B for providing altimetry observation layers can include, but is not limited to including, the steps of accepting 131 user altimetry file input, parsing 133 altimetry information, creating 135 a shapefile to store altimetry information, and adding 137 the altimetry shapefile to the map.

Figure 8C:
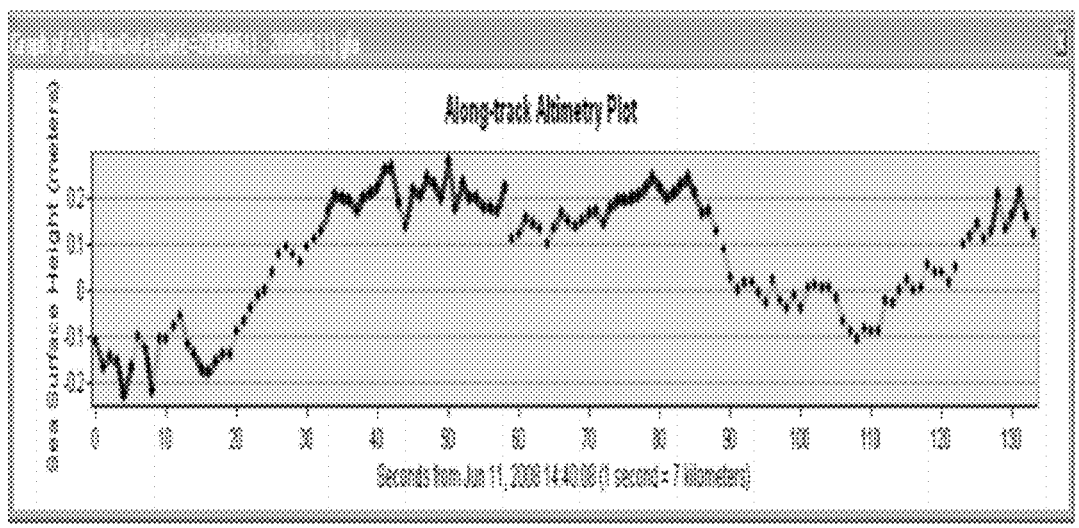
FIG. 8C is a screen shot of an altimetry data plot.

Referring to FIG. 8C, altimetry data can be analyzed by creating a graph to display the sea surface height values between two selected altimetry points. The colors of the points within the graph can be based on the colors of the points in ArcMap.

Figure 8D:
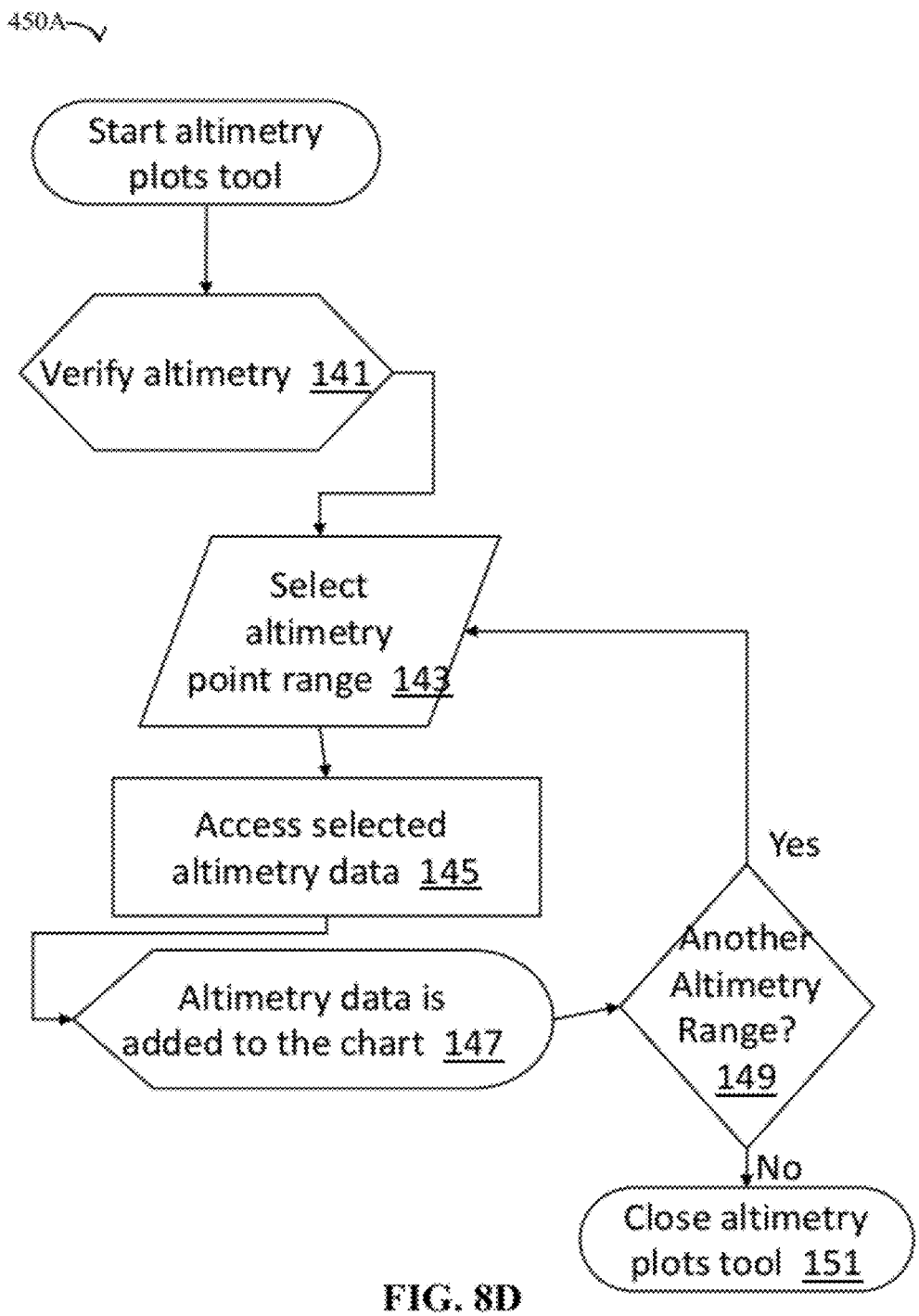
FIG. 8D is a schematic block diagram of the method for processing altimetry plots.

Referring now to FIG. 8D, method 450A for plotting altimetry data can include, but is not limited to including, the steps of verifying 141 altimetry data, selecting 143 an altimetry point range, accessing 145 selected altimetry data based on the altimetry point range, adding 147 the altimetry data to the chart, and, if 149 there is another altimetry range specified, repeating steps 143-149.

Figure 9A:
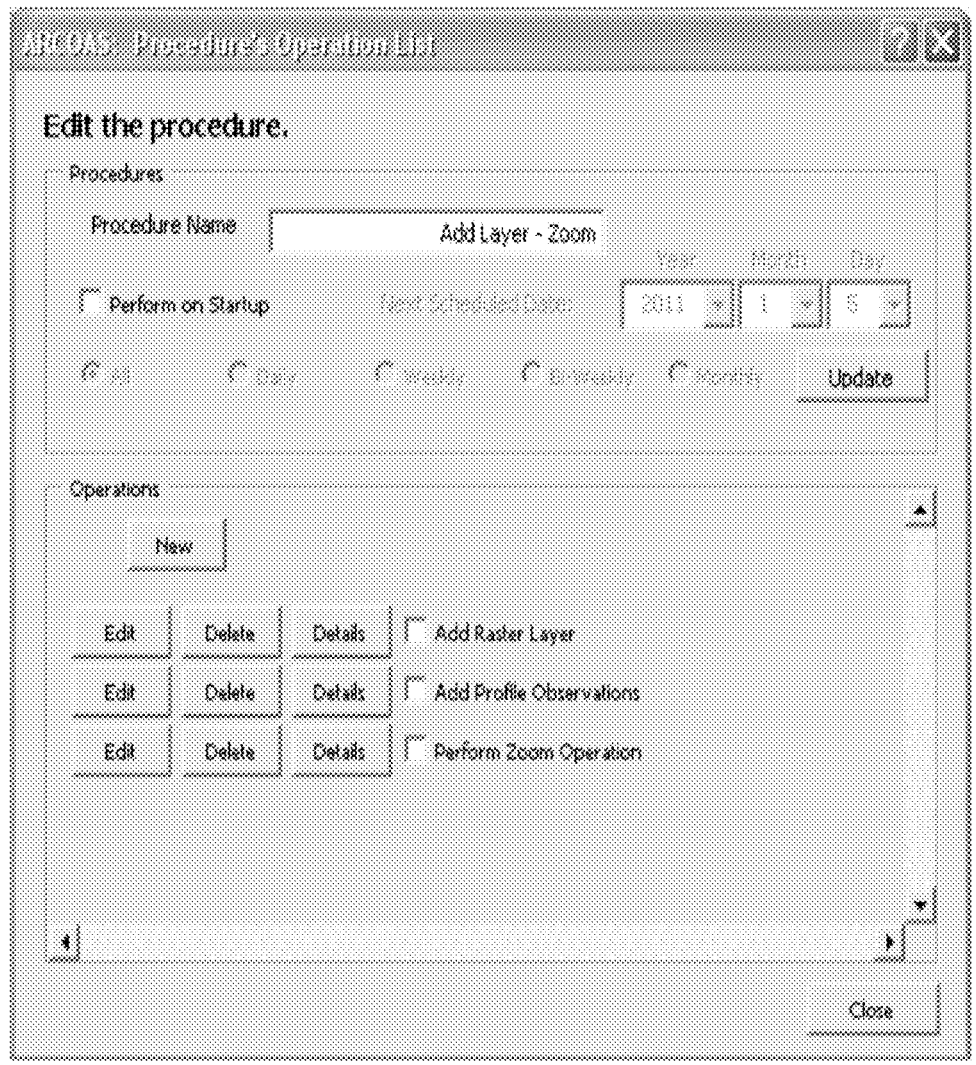
FIG. 9A is a screen shot of a procedure creation user interface.
Figure 9B:
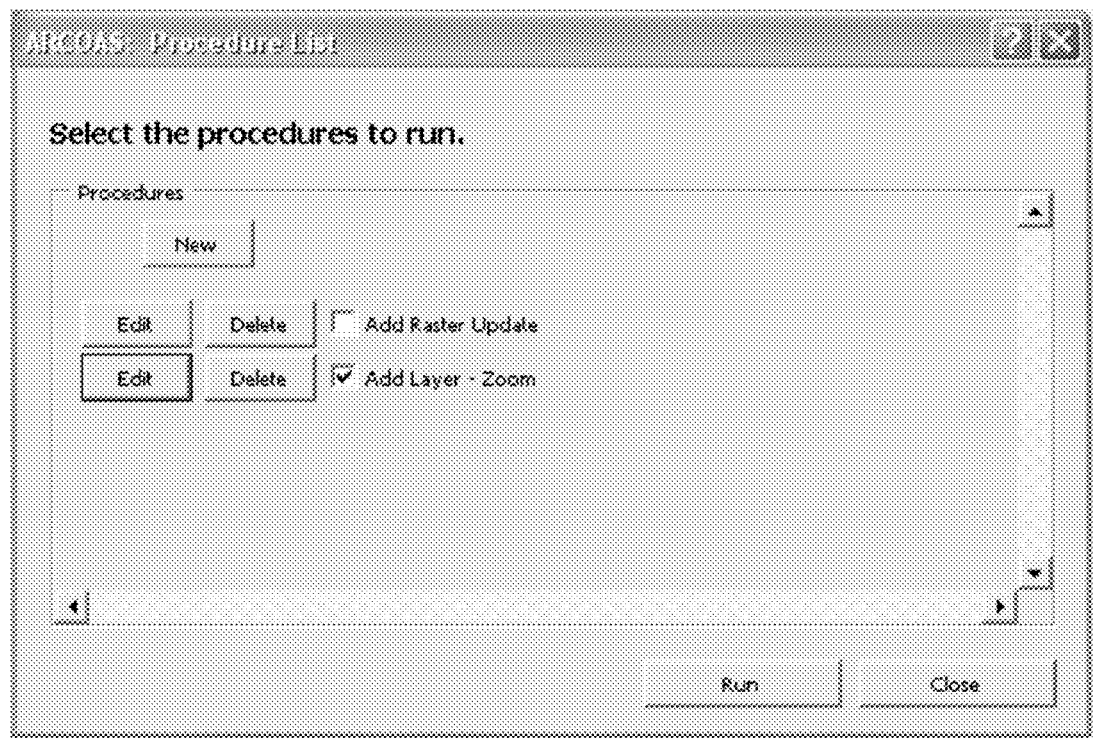
FIG. 9B is a screen shot of a procedure selection user interface.
Figure 9B:
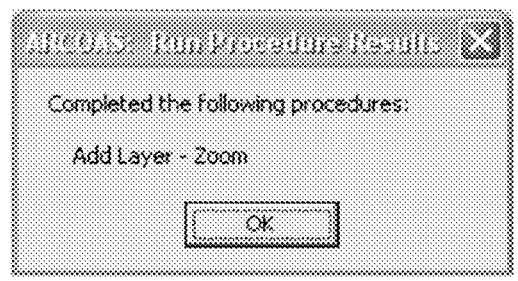
Figure 9C:
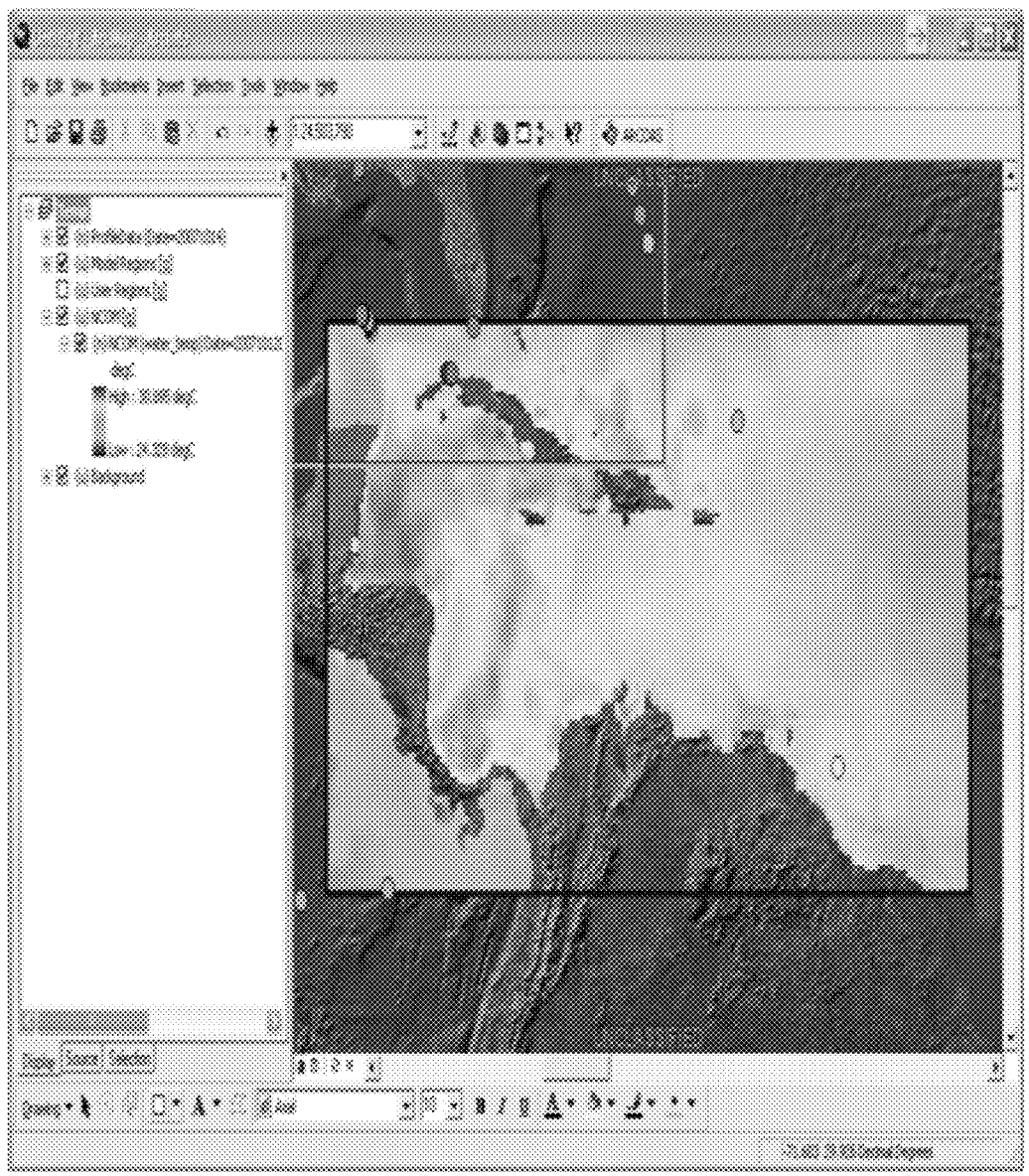
FIG. 9C is a screen shot of the result of executing a procedure created according to the present embodiment.

Referring now to FIG. 9A-9C operations such as, for example, adding a raster layer, adding a symbol layer, adding a difference layer, adding an observation layer, and zooming to a location on the map, that are performed often can be organized so that the operations can be performed as one procedure, possibly scheduled. Aspects of an operation in the operation list can be edited, for example, date information, layer details, envelope restrictions, and image creation. Raster color schemes can be assigned to parameter names from netCDF files. New parameters can be added to the list and existing parameters can be removed from the list. Color schemes can be edited to create new color schemes for rasters. The null value can be used by the stretch renderer to identify the value that is assigned a transparent color. The number of levels can be used as the number of color ramps used by the stretch renderer or the number of classification levels being rendered by the classified renderer.

Figure 9D:
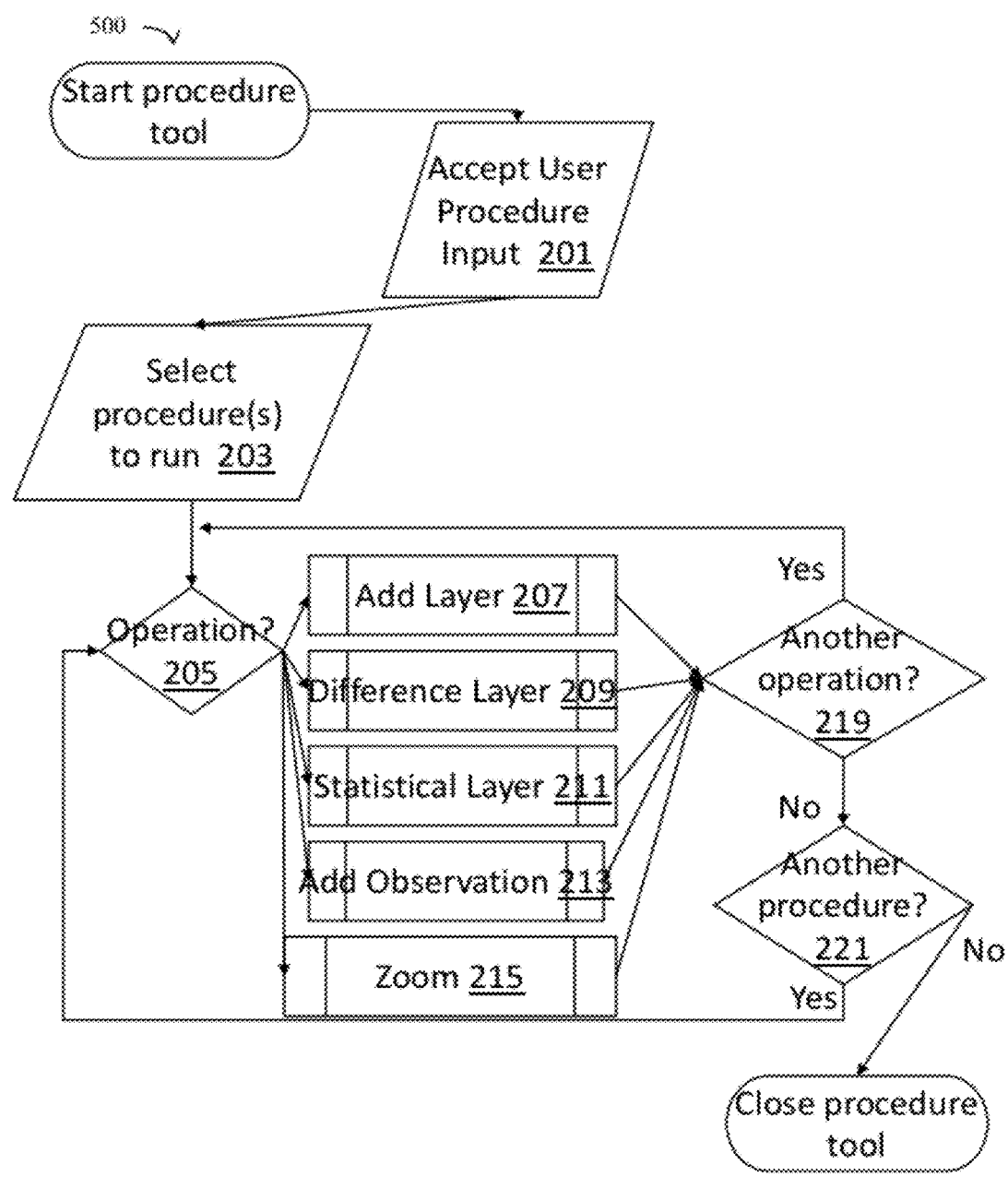
FIG. 9D is a schematic block diagram of the method for procedure creation and execution.

Referring now to FIG. 9D method 500 for selecting procedures can include, but is not limited to including, accepting 201 user procedure input with respect to which operations are to be part of the procedure, selecting 203 procedures to run, if 205 there are further operations to execute as part of the procedure, either add layer 207, create difference layers 209, create statistics layer 211, add observations 213, or zoom 215, if 219 there are other operations, repeat steps 205-219, otherwise, if 221 there are no other procedures, repeat steps 205-221.

Figure 10:
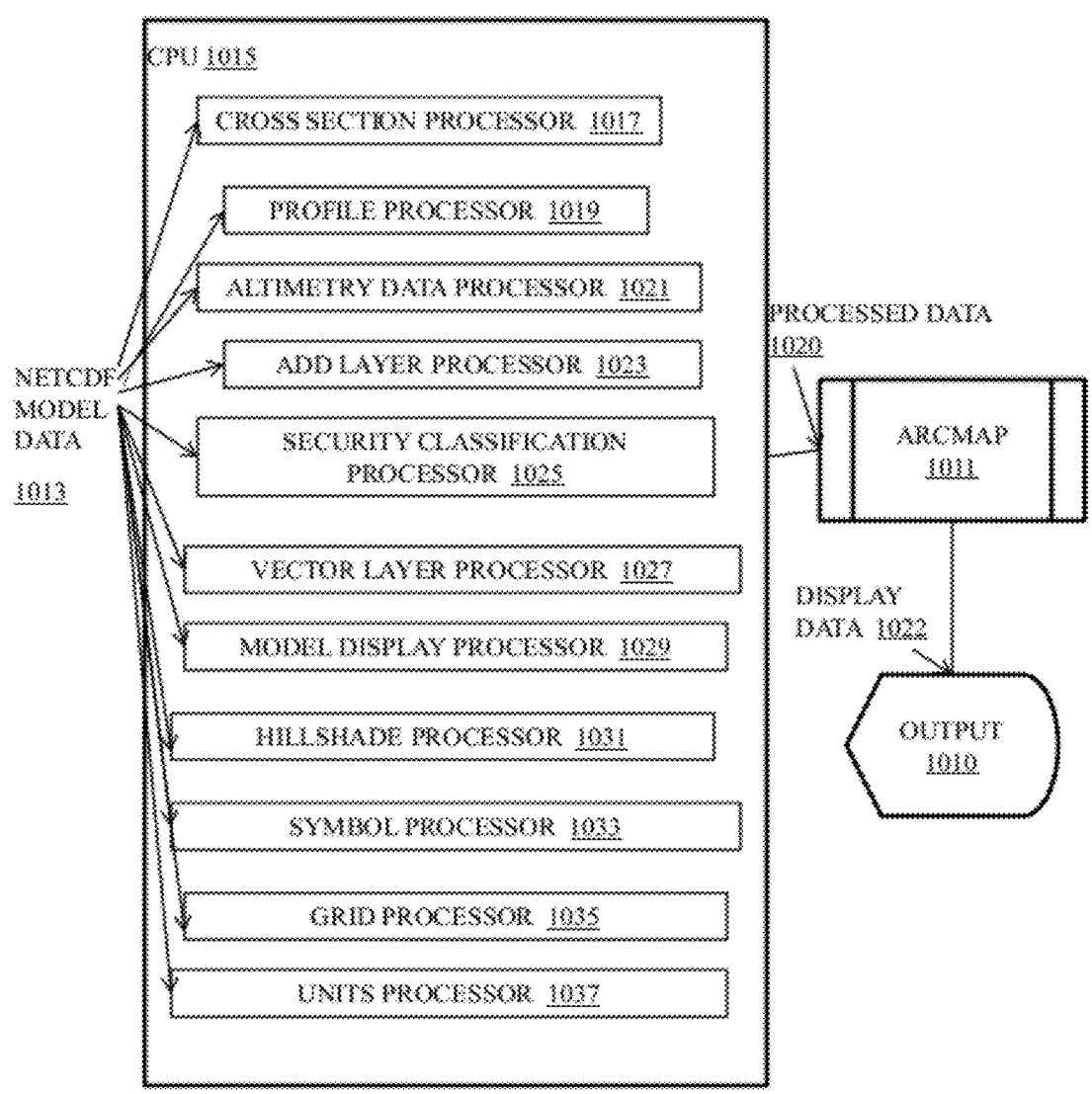
FIG. 10 is a schematic block diagram of the system of the present embodiment.

Referring now to FIG. 10, system 100 for manipulating netCDF data using ArcMap can include, but is not limited to including, CPU 1015 executing cross section processor 1017, profile processor 1019, altimetry data processor 1021, add layer processor 1023, security classification processor 1025, vector layer processor 1027, model display processor 1029, hillshade processor 1031, symbol processor 1033, grid processor 1035, and units processor 1037. Each processor received either model or netCDF data 1013, and prepares processed data 1020 for processing by ArcMap 1011, which can display those processed data as display data 1022 at output 1010.

The present embodiment is also directed to a system and methods that can be executed in hardware, firmware, and/or software for accomplishing the methods discussed herein, and, possibly, computer readable media storing software for accomplishing these methods and system. The various modules described herein can be provided in conjunction with a single CPU, or on an arbitrary number of different CPUs. Other alternative computer platforms can be used. The operating system can be, for example, but is not limited to, WINDOWS° or LINUX®. Communications links can be wired or wireless, for example, using cellular communication systems, military communications systems, and satellite communications systems. Any data and results can be stored for future retrieval and processing, printed, displayed, transferred to another computer, and/or transferred elsewhere.

In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again to FIGS. 1B, 2E, 3B, 4B, 5B, 6B, 7B, 8B, 8D, and 9D, methods 150, 200, 250, 250A, 300, 350, 400, 450A, 450B, and 500 can be, in whole or in part, implemented electronically. Signals representing actions taken by elements of systems that implement the methods of the present embodiment, and other disclosed embodiments can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A method for creating a vertical cross section of non-bathymetric data on a map comprising:
receiving a cross section maximum depth and a cross section slice location;
creating a data frame in a conventional geospatial processing computer program;
accessing selected netCDF data of the non-bathymetric data from a numerical model, the selected netCDF data coinciding with a cross section slice that extends vertically from the cross section line to the cross section maximum depth;
interpolating between the selected netCDF data points across the cross section slice;
creating a raster pixel-by-pixel using the selected netCDF data and the interpolated data across the cross section slice;
adding the raster to the data frame to create a cross section display;
indicating the cross section slice location on the map;
creating an X-axis and a Y-axis and adding the X-axis and Y-axis to the cross section display;
adding a title to the cross section display;
setting a color scheme of the raster; and
creating a window to focus on the cross section slice location on the map.

2. The method as in claim 1 further comprising:
receiving a cross section contour line switch and a cross section bathymetry switch;
adding contouring to the raster if the cross section contour line switch is on;
creating a bathymetry layer; and
adding the bathymetry layer if the cross section bathymetry switch is on.

3. A computer-based method for creating a vertical cross section of non-bathymetric data on a map comprising:
receiving a cross section maximum depth and a cross section slice location;
creating, by a computer, a data frame in a conventional geospatial processing computer program;
accessing, by the computer, selected netCDF data of the non-bathymetric data from a numerical model, the selected netCDF data coinciding with a cross section slice that extends vertically from the cross section line to the cross section maximum depth;
creating, by the computer, a raster pixel-by-pixel using the selected netCDF data;
adding, by the computer, the raster to the data frame to create a cross section display;
indicating, by the computer, the cross section slice location on the map;
creating, by the computer, a window to focus on the cross section slice location on the map;
interpolating, by the computer, between the selected netCDF data points across the cross section slice; and
creating, by the computer, a raster pixel-by-pixel using the selected netCDF data and the interpolated data across the cross section slice.

4. A computer-based method for creating a vertical cross section of non-bathymetric data on a map comprising:
receiving a cross section maximum depth and a cross section slice location;
creating, by a computer, a data frame in a conventional geospatial processing computer program;
accessing, by the computer, selected netCDF data of the non-bathymetric data from a numerical model, the selected netCDF data coinciding with a cross section slice that extends vertically from the cross section line to the cross section maximum depth;
interpolating, by the computer, between the selected netCDF data points across the cross section slice;
creating, by the computer, a raster using the selected netCDF data and the interpolated data across the cross section slice;
adding, by the computer, the raster to the data frame to create a cross section display;
indicating, by the computer, the cross section slice location on the map; and
creating, by the computer, a window to focus on the cross section slice location on the map.

5. The method as in claim 4 further comprising:
creating, by the computer, the raster pixel-by-pixel.

6. The method as in claim 1 further comprising:
receiving, by the computer, profile information;
storing, by the computer, the profile information in a shapefile;
adding, by the computer, the profile shapefile to a profile layer on the map; and
adjusting, by the computer, symbols based on the age of the profile information.

7. The method as in claim 6 further comprising:
receiving, by the computer, a selected model data location of numerical model data;

receiving, by the computer, a selected profile location of a profile observation associated with the profile information;

adding, by the computer, a marker to the map to denote the model data location and the profile location;

accessing, by the computer, the profile observation and the selected numerical model data; and graphing, by the computer, the profile observation and the selected numerical model data on a chart.

8. The method as in claim 7 further comprising:
analyzing the profile observation including:
parsing matchup data associated with the profile observation and the selected numerical model data;
performing statistics on the parsed matchup data; and
displaying profile and bar graphs based on the parsed matchup data, the profile observation, and the selected numerical model data.

9. The method as in claim 1 further comprising:
displaying altimetry data including:
receiving the altimetry data;
storing the altimetry data in a shapefile;
adding the shapefile as a layer on the map; and
adjusting symbols on the map based on sea surface height of the altimetry data.

10. The method as in claim 9 wherein displaying altimetry data further comprises:
receiving an altimetry point range;
accessing the altimetry data based on the altimetry point range;
adding the altimetry data to the map; and
coloring the altimetry data in the chart like the map altimetry data.

11. The method as in claim 1 comprising:
performing multiple add layer operations including:
receiving a list of user-defined add layer operations;
saving the operation list; and
executing the user-defined add layer operations from the operation list.

12. The method as in claim 11 wherein performing multiple add layer operations comprises:
determining a security classification of at least one layer added during said executing;
appending the security classification of the at least one layer to a name of the at least one layer; and
maintaining the security classification for the at least one layer including:
determining at least one of the security classifications from numerical model data associated with the at least one layer;
adding at least one classification layer to the map, the at least one classification layer having a name based on the determined security classification;
updating the security classification of the map based on the determined security classification;
maintaining the updated security classification on the map as the map changes and as the determined security classification changes; and
displaying a highest of the security classifications of the at least one layer.

13. The method as in claim 1 further comprising:
creating a vector layer, using numerical model data, including:
verifying that the numerical model data includes u-component and v-component data;
creating a u-component raster layer containing the u-component data;
creating a v-component raster layer containing the v-component data;
calculating magnitude and direction information from pixel data from the u-component and v-component raster layers;
storing the magnitude and direction in a shapefile; and
creating a symbol layer based on the shapefile.

14. The method as in claim 13 where creating a vector layer further comprises:
receiving symbol shape information;
adjusting symbols in the symbol layer based on the symbol shape information; and
adjusting characteristics of the symbols based on the zoom level of the map.

15. The method as in claim 1 further comprising:
displaying numerical model data coverage including:
storing regional bounds of latitude and longitude from the numerical model data in a shapefile; and
adding a layer based on the shapefile.

16. The method as in claim 1 further comprising:
creating a classified renderer including:
receiving a number of levels for the classified renderer;
receiving a minimum value for a first pre-selected classification level;
assigning a color for the first pre-selected classification level;
receiving a maximum value for a second pre-selected classification level;
assigning a color for the second pre-selected classification level; and
creating the classified renderer by evenly dividing values between the first level and the second level, and by determining a color ramp between the first color and the second color.

17. The method as in claim 1 further comprising:
adding hillshades for a raster layer including:
receiving any of azimuth, altitude, Z factor or model shadows;
creating, by the computer, a hillshade layer;
placing, by the computer, the hillshade layer under the raster layer;
grouping, by the computer, the hillshade layer with the raster layer; and
making, by the computer, the raster layer partially transparent.

18. A system for creating a vertical cross section of non-bathymetric data on a map comprising:
a cross section processor receiving a cross section maximum depth and a cross section slice location, creating a data frame in a conventional geospatial processing computer program, accessing selected netCDF data of the non-bathymetric data from a numerical model, the selected netCDF data coinciding with a cross section slice that extends vertically from the cross section line to the cross section maximum depth, creating a raster pixel-by-pixel using the selected netCDF data, adding the raster to the data frame to create a cross section display, indicating the cross section slice location on the map, and creating a window to focus on the cross section slice location on the map;
a profile processor receiving profile information, storing the profile information in a shapefile, adding the profile shapefile to a profile layer on the map, adjusting symbols based on the age of the profile information, analyzing the profile information including parsing matchup data associated with the profile observation and the selected numerical model data, performing statistics on the parsed matchup data, and displaying profile and bar graphs based on the parsed matchup data, the profile observation, and the selected numerical model data;

an altimetry data processor displaying altimetry data including receiving the altimetry data, storing the altimetry data in a shapefile, adding the shapefile as a layer on the map, adjusting symbols on the map based on sea surface height of the altimetry data, receiving an altimetry point range, accessing the altimetry data based on the altimetry point range, adding the altimetry data to the map, and coloring the altimetry data in the chart like the map altimetry data; and a security classification processor determining a security classification of at least one layer, appending the security classification of the at least one layer to a name of the at least one layer, maintaining the security classification for the at least one layer including determining at least one of the security classifications from numerical model data associated with the at least one layer, adding at least one classification layer to the map, the at least one classification layer having a name based on the determined security classification, updating the security classification of the map based on the determined security classification, maintaining the updated security classification on the map as the map changes and as the determined security classification changes, and displaying a highest of the security classifications of the at least one layer.

19. The system as in claim 18 further comprising:

a vector layer processor creating a vector layer using numerical model data, the vector layer processor including verifying that the numerical model data includes u-component and v-component data, creating a u-component raster layer containing the u-component data, creating a v-component raster layer containing the v-component data, calculating magnitude and direction information from pixel data from the u-component and v-component raster layers, storing the magnitude and direction in a shapefile, creating a symbol layer based on the shapefile, receiving symbol shape information, adjusting symbols in the symbol layer based on the symbol shape information, and adjusting characteristics of the symbols based on the zoom level of the map.

* * * * *